United States Patent
Niwa et al.

(10) Patent No.: US 7,240,541 B2
(45) Date of Patent: Jul. 10, 2007

(54) OPTICAL MICROCANTILEVER, MANUFACTURING METHOD THEREOF, AND OPTICAL MICROCANTILEVER HOLDER

(75) Inventors: Takashi Niwa, Chiba (JP); Kenji Kato, Chiba (JP); Susumu Ichihara, Chiba (JP); Norio Chiba, Chiba (JP); Yasuyuki Mitsuoka, Chiba (JP); Manabu Oumi, Chiba (JP); Nobuyuki Kasama, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/602,373

(22) Filed: Nov. 20, 2006

(65) Prior Publication Data

US 2007/0062266 A1     Mar. 22, 2007

Related U.S. Application Data

(62) Division of application No. 10/949,952, filed on Sep. 24, 2004, now Pat. No. 7,150,185, which is a division of application No. 09/700,323, filed as application No. PCT/JP00/01361 on Mar. 6, 2000, now Pat. No. 6,834,537.

(30) Foreign Application Priority Data

Mar. 17, 1999 (JP) .................. 11-72218
Feb. 17, 2000 (JP) .................. 2000-40030

(51) Int. Cl.
*G01N 13/14* (2006.01)
(52) U.S. Cl. ........................................ 73/105
(58) Field of Classification Search ................ None
See application file for complete search history.

(56) References Cited

FOREIGN PATENT DOCUMENTS

EP    0884617 A1 * 12/1998

* cited by examiner

*Primary Examiner*—Hezron Williams
*Assistant Examiner*—Paul M. West
(74) *Attorney, Agent, or Firm*—Adams & Wilks

(57) ABSTRACT

An optical microcantilever capable of reducing loss when propagating light. An optical microcantilever 10 comprises a support 1, an optical waveguide 2, a light-blocking film 3, a reflecting film 4, a pointed tip 5, a microscopic aperture 6 formed at the end of the tip 5, and a mirror 7 for reflecting propagating light H propagated from a light input/output end 8 of the optical waveguide 2 towards the microscopic aperture 6.

15 Claims, 26 Drawing Sheets

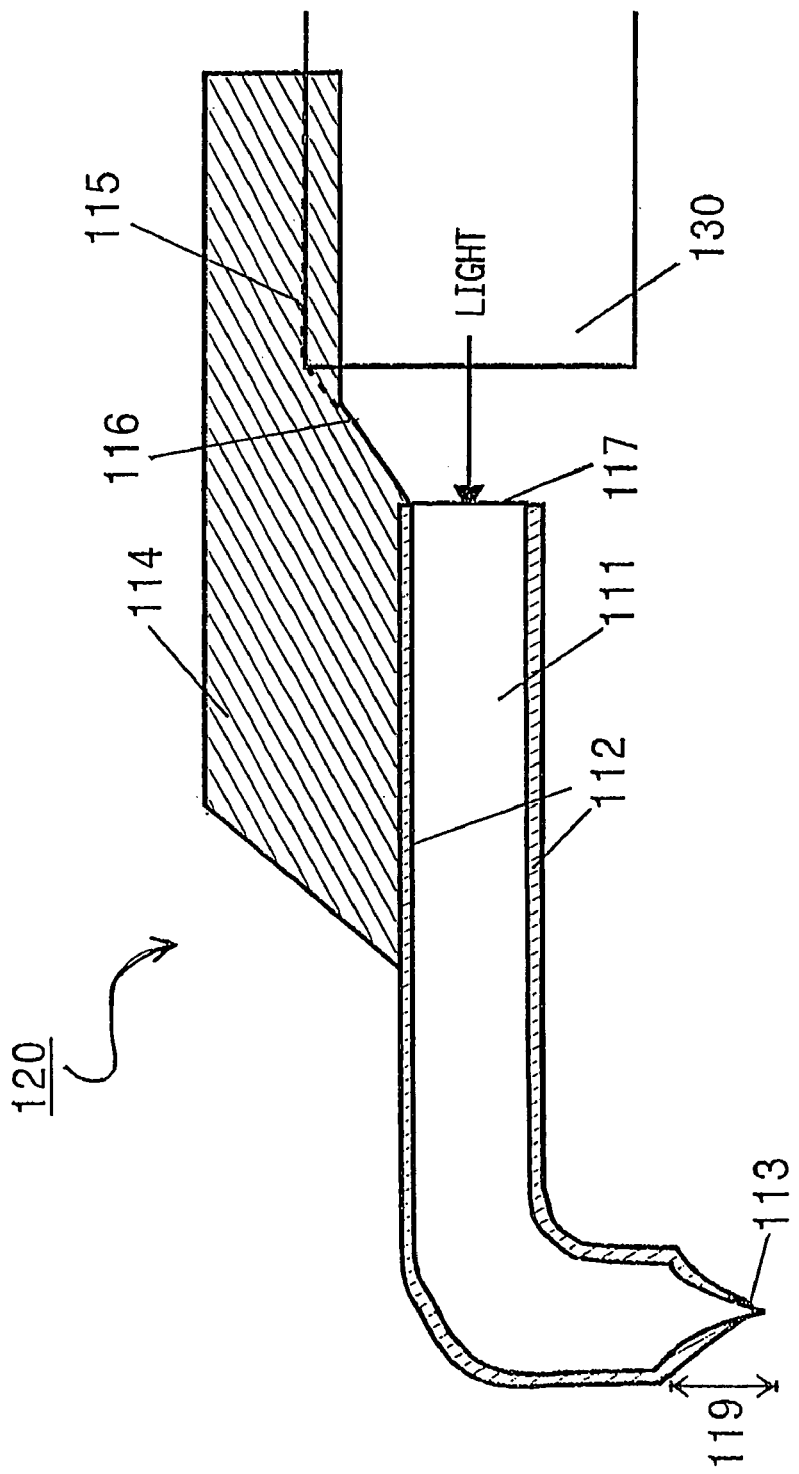

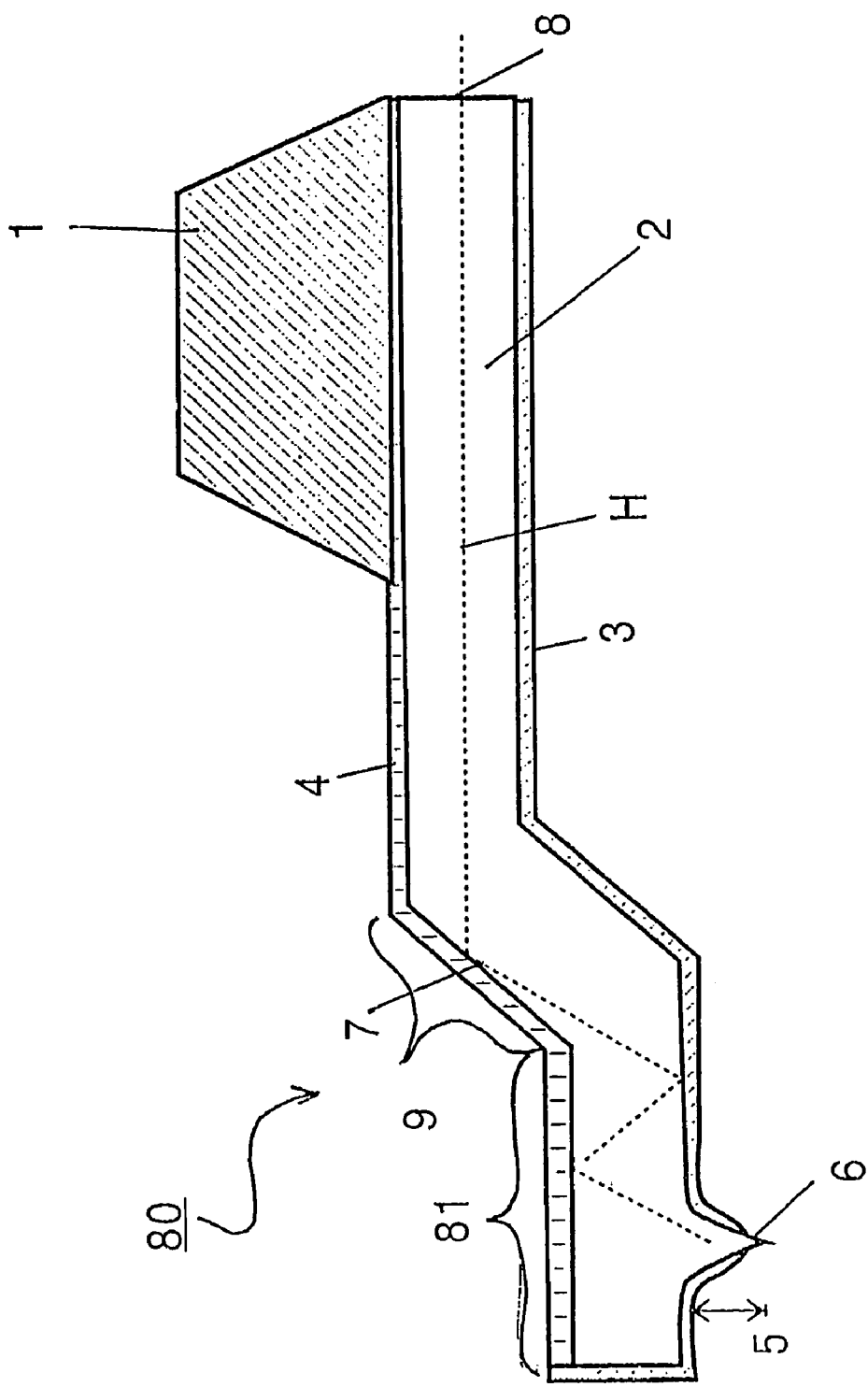

F I G. 1 6 A
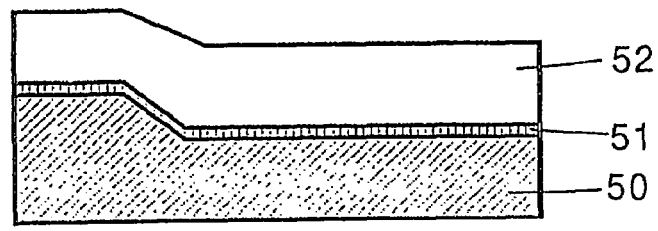
F I G. 1 6 B
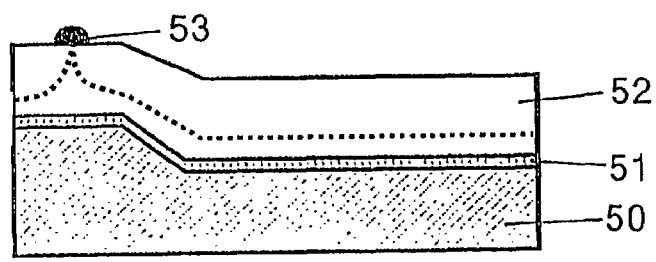

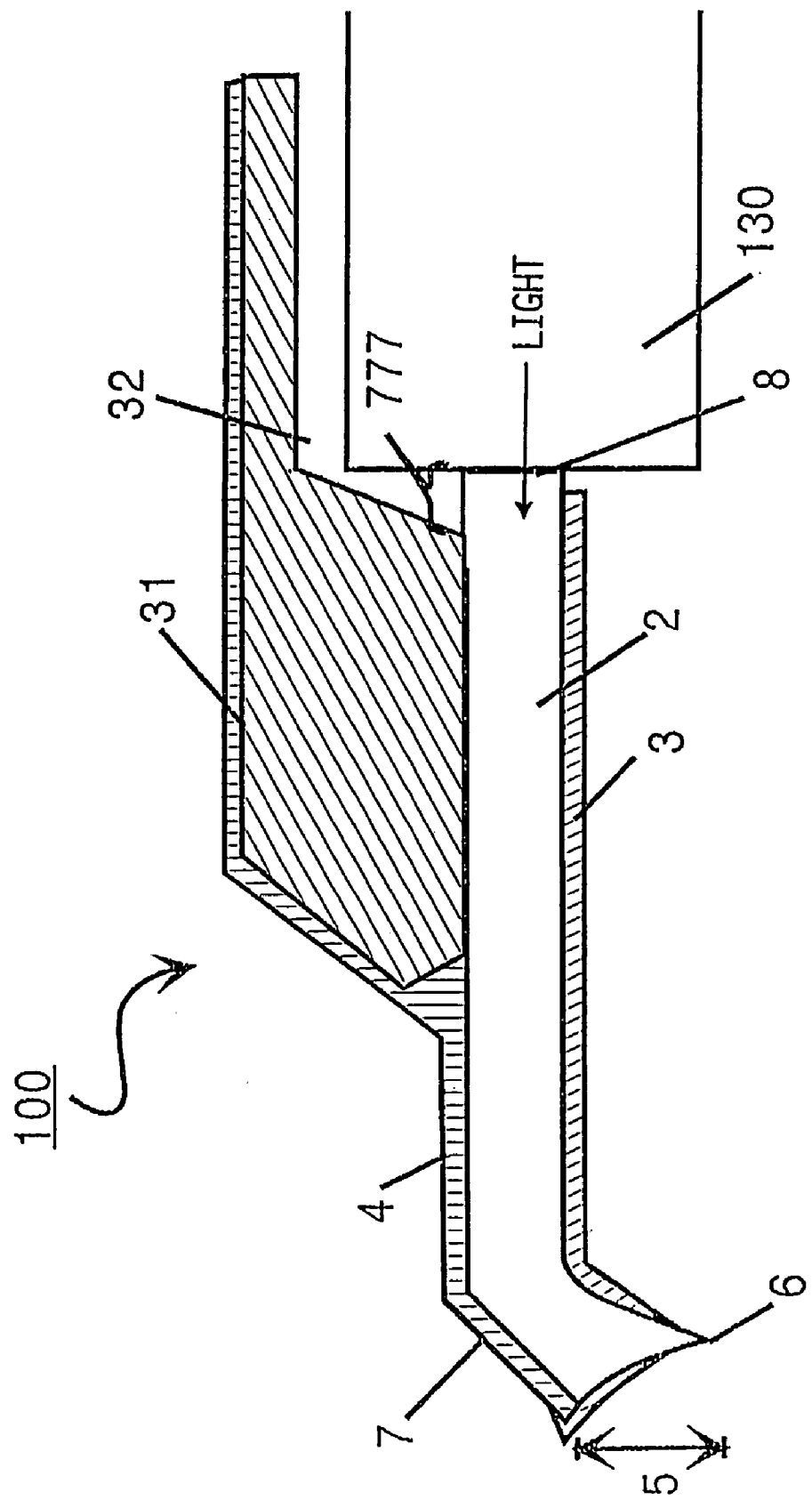

32

32     Y

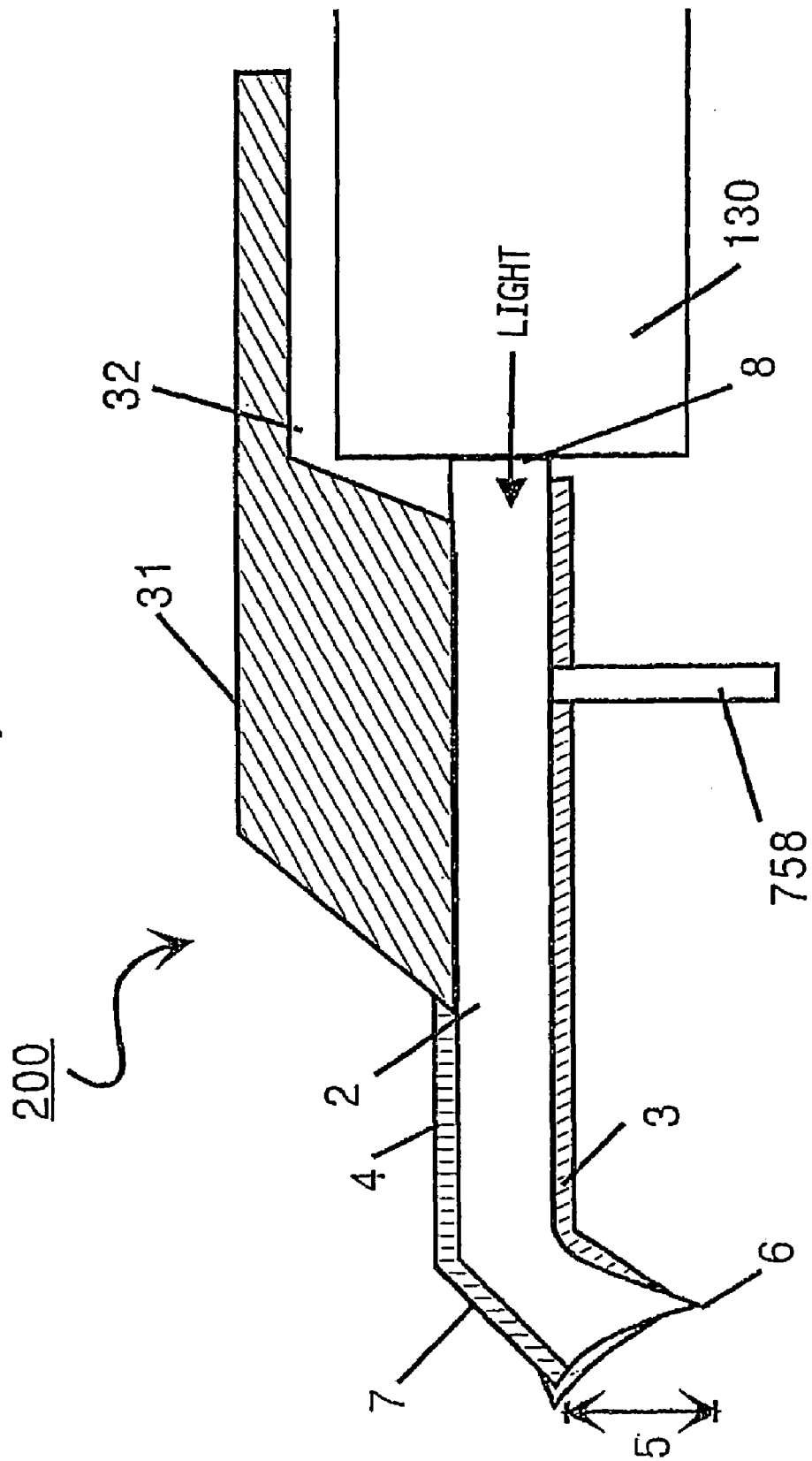

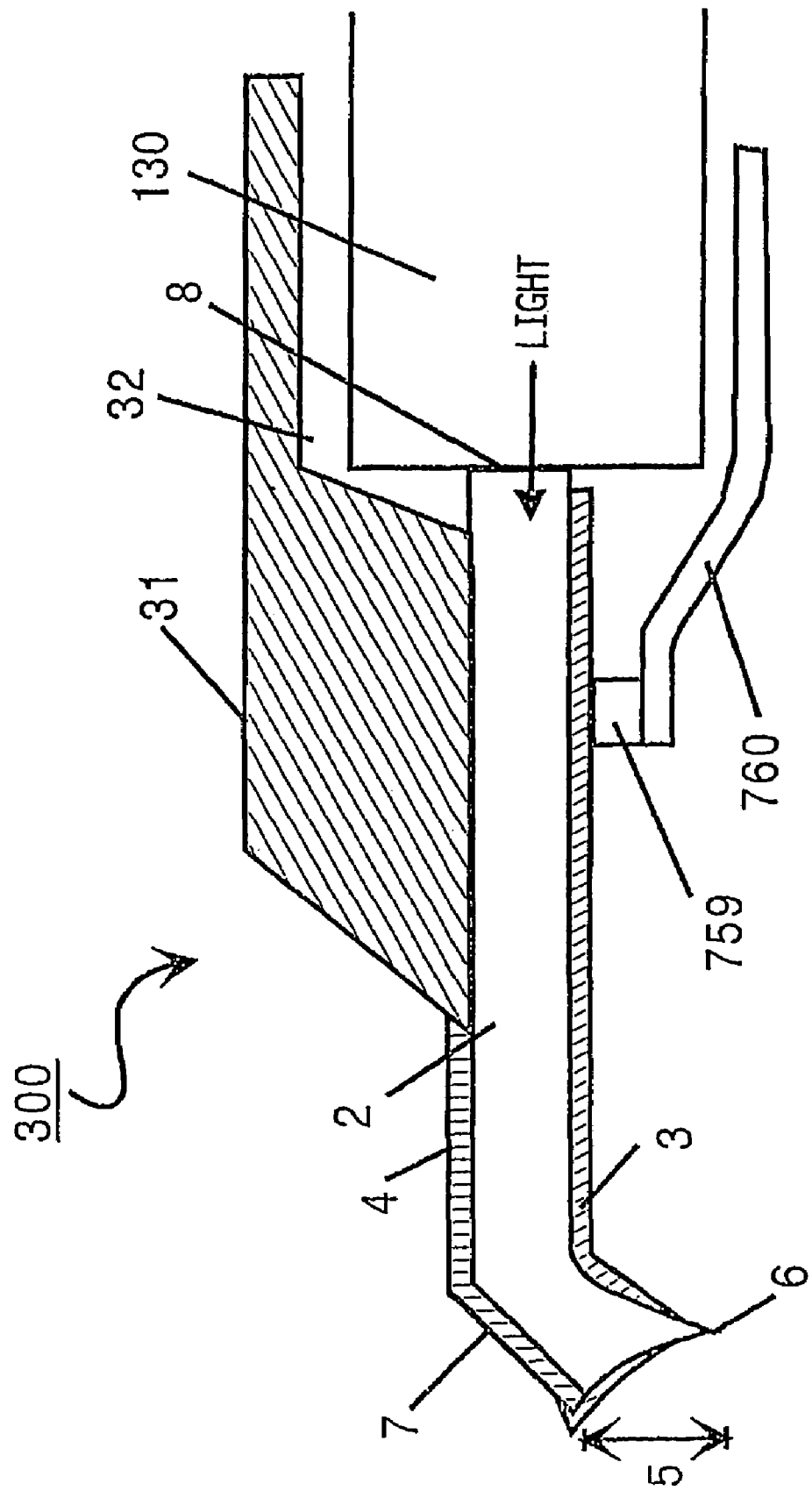

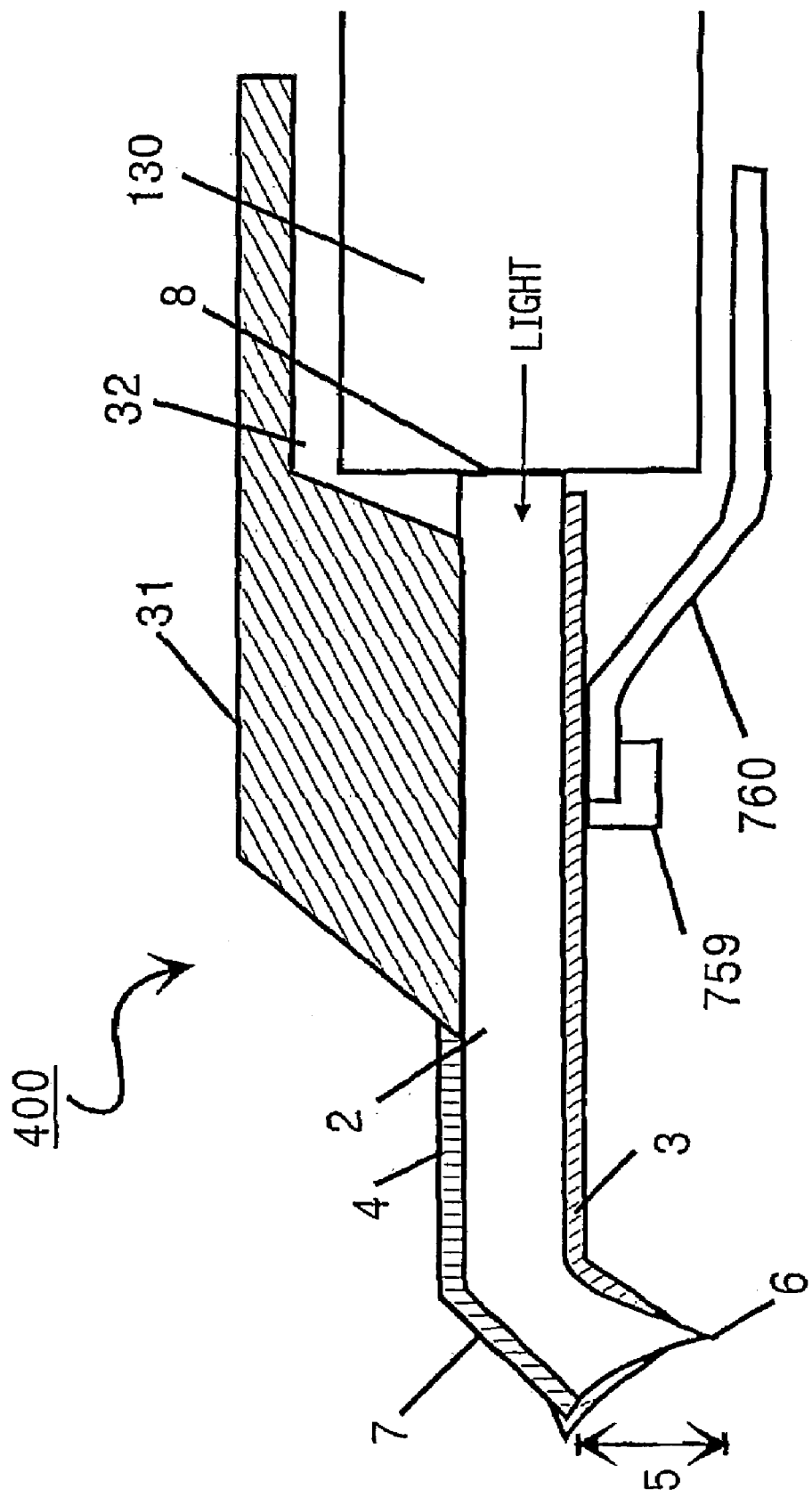

US 7,240,541 B2

OPTICAL MICROCANTILEVER, MANUFACTURING METHOD THEREOF, AND OPTICAL MICROCANTILEVER HOLDER

CROSS REFERENCE TO RELATED APPLICATIONS

The application is a division of application Ser. No. 10/949,952, now U.S. Pat. No. 7,150,185, which is a division of application Ser. No. 09/700,323, now U.S. Pat. No. 6,834,537, which is a U.S. national stage application of International Application Serial No. PCT/JP00/01361, filed on Mar. 6, 2000 claiming a priority date of Mar. 17, 1999, and published in a non-English language.

TECHNICAL FIELD

The present invention relates to an optical microcantilever capable of effectively propagating light, and a manufacturing method thereof, and a microcantilever holder for fixing an optical element actuated by the optical microcantilever and light incident to the optical microcantilever, and light outputted from the optical microcantilever.

BACKGROUND ART

With such scanning near field microscopes, the tip of a rectilinear optical fiber probe maintained perpendicular to the sample is made to vibrate horizontally with respect to the sample surface and changes in the amplitude of vibrations occurring due to the shear force between the sample surface and the tip of the optical fiber are detected. Changes in the amplitude are detected by irradiating the tip of the optical fiber probe with laser light and detecting changes in the shadow of the tip. A gap between the tip of the optical fiber probe and the surface of the material is kept fixed by moving the sample using a fine-motion mechanism so that the amplitude of the vibrations of the optical fiber probe are constant, and the shape of the surface is detected and the optical permeability of the sample measured from the intensity of a signal inputted to the fine-motion mechanism.

There is also proposed (in Japanese Patent Publication Laid-open No. Hei. 7-17452) a scanning near field atomic force microscope where near field light is generated at the tip of an optical fiber probe as a result of introducing laser light into an optical fiber probe simultaneously with an AFM operation employing the pointed optical fiber probe as a cantilever for an atomic force microscope (hereinafter referred to as AFM) and the shape of the surface of a sample is detected and the optical characteristics of the sample are measured using the mutual interaction between the generated near field light and the sample. FIG. 12 is a side cross-section of a related example of an optical waveguide probe. This optical waveguide probe 110 employs an optical waveguide 101 as an optical fiber and the optical waveguide 101 is surrounded by a metal film 102. A pointed tip 103 is formed at one end of the optical waveguide probe 110 and a microscopic aperture 104 for generating near field light is provided at the end of the tip 103. The tip 103 is formed by bending the tip of the optical waveguide probe 110 around towards the sample (not shown).

Microcantilevers of the kind shown in FIG. 13 are well known in the related art (T. Niwa et al., Journal of Microscopy, vol. 194, pt. 2/3, pp. 388–392). At an optical microcantilever 120, an optical waveguide 111 is laminated from a core layer and a cladding layer and a metal film 112 is provided at the surface of the optical waveguide 111. A pointed tip 119 is formed at one end of the optical mircocantilever 120 and a support section 114 for fixing the optical microcantilever 120 is formed at the other end of the optical microcantilever 120. A microscopic aperture 113 for generating near field light is provided at the end of the tip 119.

The end of the optical microcantilever 120 at which the tip 119 is formed is referred to as the free end of the cantilever, and the optical waveguide end where the support section 114 is formed is referred to as the incident light end 117. The free end is bent in such a manner that the microscopic aperture 113 becomes in close proximity to the sample (not shown), and light propagated from the incident light end 117 enters the optical waveguide 111

An optical fiber guide channel 115 for fixing the optical fiber is formed at the support section 114. FIG. 14 shows the situation when an optical fiber 130 is fixed to the optical fiber guide channel 115. Light propagating from the optical fiber 130 enters the optical waveguide 111 via the incident light end 117 and is guided to the microscopic aperture 113 by the optical waveguide 111. Near field light is generated in the vicinity of the microscopic aperture 113 as a result of propagating light attempting to pass through the microscopic aperture 113. Conversely, near field light generated at the surface of the sample is scattered by the microscopic aperture 113 so as to generate propagating light and this propagating light can be detected at the incident light end 117 via the microscopic aperture 113 and the optical waveguide 111. Installation of the optical fiber 130 is straightforward because the optical fiber guide channel 115 is provided at the support section 114 and there is little trouble involved in aligning the optical microcantilever 120 and the optical fiber 130 during changing, etc.

However, productivity for the optical waveguide probe 110 is poor because the optical fiber 101 is employed as a material, which involves a large number of steps and is made manually. Further, even if the optical fiber 101 is covered in the metal film 102, propagating light loss occurs at locations where the optical fiber 101 is bent and light is therefore not propagated in an efficient manner, with this loss becoming more substantial as the angle of bending becomes more dramatic. Conversely, if the angle of bending is made smoother, the optical fiber probe becomes longer and handling therefore becomes more troublesome.

The optical microcantilever 120 has superior productivity and uniformity but loss of propagating light occurs at the optical waveguide 111 even when the metal film 112 is provided at the surface of the optical waveguide 111 and the propagating light cannot be propagated in an effective manner. In this manufacturing process, a smooth sloping surface 116 occurs between the incident light end 117 and the optical fiber guide channel 115 as shown in FIG. 14 and it is therefore difficult to get the optical fiber 130 sufficiently close to the incident light end 117 and the efficiency of the incident light is poor, i.e. coupling loss increases. Light is scattered at the incident light end 117 of the optical microcantilever 120 while light is made to pass through the incident light end 117 by the optical fiber 130 and scattered light also propagates in the direction of the microscopic aperture 113. This therefore causes the S/N ratio of a light image for the scanning type near field microscope to fall.

In order to resolve the aforementioned problems in the conventional art, it is an object of the present invention to provide an optical microcantilever bar capable of admitting and propagating light in an efficient manner, and a manufacturing method for making the optical microcantilever. It is a further object to provide an optical microcantilever holder for supporting the optical microcantilever bar and an optical element. It is a still further object to provide an optical microcantilever bar capable of improving an S/N ratio of a light image of a scanning near field microscope.

SUMMARY OF THE INVENTION

In order to achieve the aforementioned objects, an optical microcantilever according to a first embodiment of the invention is an optical microcantilever for use with a scanning near field microscope and comprises an optical waveguide, having a light input/output end and a free end, for propagating light, a tip formed at the free end, with a microscopic aperture at an end thereof, and reflecting means for reflecting light propagated from the light input/output end in such a manner that the light is guided towards the microscopic aperture, or reflecting light propagated from the microscopic aperture towards the light input/output end.

The above optical microcantilever is provided with reflecting means for reflecting light propagated from the light input/output end in such a manner that the light is guided towards the microscopic aperture, or reflecting light propagated from the microscopic aperture towards the light input/output end. This reflecting means reflects propagating light in an efficient manner and reduces loss in light propagated towards the microscopic aperture.

Further, an optical microcantilever according to a second embodiment of the invention is an optical microcantilever for use with a scanning near field microscope and comprises an optical waveguide, having a light input/output end and a free end and a nose section at an angle with respect to an optical axis of propagating light passing through the light input/output end, for propagating light, a tip formed at the free end, with a microscopic aperture an an end thereof, and reflecting means for reflecting light propagated from the light input/output end in such a manner that the light is guided towards the microscopic aperture, or reflecting light propagated from the microscopic aperture towards the light input/output end.

The above optical microcantilever is provided with reflecting means for reflecting light propagated from the light input/output end in such a manner that the light is guided towards the microscopic aperture, or reflecting light propagated from the microscopic aperture towards the light input/output end, and a portion having an angle with respect to an optical axis of propagating light passing through the light input/output end. This reflecting means reflects propagating light in an efficient manner and reduces loss in light propagated towards the microscopic aperture. It is therefore possible to observe the surface of a material having a large step by adjusting the length of the portion having an angle with respect to the optical axis of the propagating light passing through the light input/output end.

In the optical microcantilever according to the first and second embodiments of the invention, at least part of the optical waveguide comprises a core, and a cladding is deposited on one side of the core, or both sides of the core, or is deposited so as to surround the core.

Because the optical waveguide of this optical microcantilever comprises a core, and cladding deposited on one side of the core, or both sides of the core, or deposited so as to surround the core, propagating light propagated by the optical waveguide is prevented from leaking to the outside, and the propagating light is propagated within the optical waveguide under conditions of total reflection.

In the optical microcantilever according to the foregoing embodiments, a light-blocking film is provided on the optical waveguide at the side where the tip is formed, and a reflecting film is provided at the opposite side to the side where the tip is formed.

As a result of providing this optical microcantilever with a light-blocking film on the optical waveguide at the side where the tip is formed, and a reflecting film at the opposite side to the side where the tip is formed, propagating light propagated by the optical waveguide is prevented from leaking to the outside.

In order to achieve the aforementioned objects, a method according to a first embodiment of manufacturing an optical microcantilever is a method for manufacturing an optical microcantilever for use with a scanning near field microscope and includes the steps of forming a step to be taken as a mold for an optical waveguide at the substrate, depositing a reflecting film on the substrate, depositing an optical waveguide on the reflecting film, forming a tip by working the optical waveguide, depositing a light-blocking film on the optical waveguide, forming a microscopic aperture at the end of the tip, and forming a supporting section by having the substrate remain on the side to be a light input/output end and removing the substrate on the side to be the free end.

This method of manufacturing an optical microcantilever includes the steps of forming a step to be taken as a mold for an optical waveguide at the substrate, depositing a reflecting film on the substrate, depositing an optical waveguide on the reflecting film, forming a tip by working the optical waveguide, depositing a light-blocking film on the optical waveguide, forming a microscopic aperture at the end of the tip, and forming a supporting section by having the substrate remain on the side to be a light input/output end and removing the substrate on the side to be the free end.

The above optical microcantilever is provided with a reflecting film for reflecting light propagated from the light input/output end in such a manner that the light is guided towards the microscopic aperture, and reflecting light propagated from the microscopic aperture towards the light input/output end so that propagating light can be reflected in an efficient manner and loss of propagating light can be reduced. Further, batch processing is possible for these processes by employing silicon processing, and optical microcantilevers with superior productivity and uniformity can therefore be made.

In the method of the first embodiment for manufacturing the optical microcantilever, an angle of the step formed is an angle enabling propagating light propagating from the light input/output end to be guided towards the microscopic aperture by the reflecting film deposited in the reflecting film depositing step, or is an angle enabling propagating light propagating from the microscopic aperture to be guided towards the light input/output end.

In this method for manufacturing the optical microcantilever, the angle of the step formed in the step forming step is an angle that enables propagating light propagating from the light input/output end to be guided towards the microscopic aperture by the reflecting film deposited in the reflecting film depositing step, or is an angle that enables propagating light propagating from the microscopic aperture to be guided towards the light input/output end. The reflecting film formed in this manner reflects propagating light in an efficient manner and reduces loss of propagating light.

In order to achieve the aforementioned objects, an optical microcantilever according to a third embodiment of the invention is an optical mecrocantilever coprising a cantilever constituted by an optical waveguide, a supporting section for the cantilever, the optical waveguide having a light input/output end and a free end, an optical element guide formed at the supporting section for deciding a position of an optical element acting on light entering the optical waveguide, and a channel provided between the light input/output end and the optical element guide.

This optical microcantilever has a channel formed between the light input/output end of the optical waveguide and the optical element guide. By forming a channel between the light input/output end of the optical waveguide and the optical element guide, an inclined surface providing an obstacle between an optical element acting on light entering the light input/output end and the optical waveguide or light outputted from the optical waveguide can be made substantially perpendicular and the optical element can therefore be located close to the light input/output end.

In order to achieve the aforementioned objects, a method according to a second embodiment of manufacturing an optical microcantilever is a method for manufacturing an optical microcantilever for use with a scanning near field microscope, comprising the steps of forming a step to be taken as a mold for an optical waveguide at the substrate, forming an optical element guide at the substrate, depositing an optical waveguide on the substrate, forming a light input/output end of the optical waveguide, forming a channel by working the substrate between the light input/output end and the optical element guide, exposing the optical element guide by removing the optical waveguide on the optical element guide, and forming a supporting section by having the substrate remain on the side to be a light input/output and and removing the substrate on the side to be the free end.

This method of manufacturing an optical microcantilever includes the steps of forming a step to be taken as a mold for an optical waveguide at the substrate, forming an optical element guide at the substrate, depositing an optical waveguide on the substrate, forming a light input/output end of the optical waveguide, forming a channel by working the substrate between the light input/output end and the optical element guide, exposing the optical element guide by removing the optical waveguide on the optical element guide, and forming a supporting section by having the substrate remain on the side to be a light input/output end and removing the substrate on the side to be the free end.

A guide for fixing an optical element acting on light entering the light input/output end and the optical waveguide or light outputted from the optical waveguide can therefore be formed and an inclined surface providing an obstacle between the light input/output end and the optical element can be made substantially perpendicular. Further, batch processing is possible for these processes by employing silicon processing, and optical microcantilevers with superior productivity and uniformity can therefore be made.

In order to achieve the aforementioned objects, a method according to a third embodiment of manufacturing an optical microcantilever is a method for manufacturing an optical microcantilever for use with a scanning near field microscope, including the steps of forming a step to be taken as a mold for an optical waveguide at the substrate, forming an optical element guide at the substrate, depositing a reflecting film on the substrate, depositing an optical waveguide on the reflecting film, forming a tip by working the optical waveguide, depositing a light-blocking film on the optical waveguide, forming a microscopic aperture at the end of the tip, forming a light input/output end of the optical waveguide by removing the light blocking film, the optical waveguide, and the reflecting film, for the portion to constitute the light input/output end of the optical waveguide, forming a channel by working the substrate between the light input/output end and the optical element guide, exposing the optical element guide by removing the light-blocking film, the optical waveguide, and the reflecting film on the optical element guide, and forming a supporting section by having the substrate remain on the side to be a light input/output end and removing the substrate on the side to be the free end.

This method of manufacturing an optical microcantilever includes the steps of forming a step to be taken as a mold for an optical waveguide at the substrate, forming an optical element guide at the substrate, depositing a reflecting film on the substrate, depositing an optical waveguide on the reflecting film, forming a tip by working the optical waveguide, depositing a light-blocking film on the optical waveguide, forming a microscopic aperture at the end of the tip, forming a light input/output end of the optical waveguide by removing the light-blocking film, the optical waveguide, and the reflecting film, for the portion to constitute the light input/output end of the optical waveguide, forming a channel by working the substrate between the light input/output end and the optical element guide, exposing the optical element guide by removing the light-blocking film, the optical waveguide, and the reflecting film on the optical element guide, and forming a supporting section by having the substrate remain on the side to be a light input/output end and removing the substrate on the side to be the free end.

As a result, a guide for fixing the optical element can be formed and an inclined surface providing an obstacle between the light input/output end and the optical element can be made substantially perpendicular. Further, a reflecting film for reflecting light propagated from the light input/output end in such a manner that the light is guided towards the microscopic aperture, or reflecting light propagated from the microscopic aperture towards the light input/output end can be formed, propagating light can be reflected in an efficient manner, and there is no longer any loss of propagating light. Further, batch processing is possible for these processes by employing silicon processing, and optical microcantilevers with superior productivity and uniformity can therefore be made.

In order to achieve the aforementioned objects, there is also provided an optical microcantilever guide for supporting an optical microcantilever, and an optical element guide for deciding a position of an optical element acting on light entering the optical microcantilever or on light exiting from the optical microcantilever.

With this optical microcantilever holder, an optical microcantilever guide for supporting an optical microcantilever and an optical element guide for supporting the optical element at the optical microcantilever are formed. The optical microcantilever and the optical element can therefore be aligned simply by installing the optical microcantilever at the optical microcantilever guide and installing the optical element at the optical element guide.

In order to achieve the aforementioned objections, an optical microcantilever according to a fourth embodiment is an optical microcantilever comprising a cantilever-shaped optical waveguide, a tip formed at the free end of the optical waveguide and having a microscopic aperture at an end thereof, wherein the optical waveguide comprises a light input/output end at a fixed end thereof, a nose section formed between the free end and the fixed end at an angle with respect to an optical axis of the optical waveguide of the fixed end, and reflecting means for reflecting light propagating from the light input/output end in such a manner that the light is guided towards the nose section, and/or reflecting light detected by the microscopic aperture and transmitted to the nose section towards the light input/output end.

Further, in the optical microcantilever of the fourth embodiment, the optical waveguide has a head section at the end of the nose section extending substantially parallel with the optical waveguide of the fixed end, and the tip is formed at the head section.

This optical microcantilever can measure samples with large steps as a result of the nose section being provided, and the tip is easy to form.

In order to achieve the aforementioned objects, the optical microcantilever according to any of the foregoing embodiments has a lens provided between the tip and the reflecting means. Preferably, the lens is a convex lens. Alternatively, the lens is a Fresnel lens. Still further, the lens is preferably a gradient-index lens.

Further, the light of a high energy density can be guided into the microscopic aperture using the lens and near field light irradiated from the microscopic aperture can be of a substantial intensity. And/or, light detected by the microscopic aperture can be transmitted to a detector in an efficient manner as detection light by collimating the detected light using the lens.

In order to achieve the aforementioned objects, in the optical microcantilever according to any of the foregoing embodiments, the tip of the optical microcantilever employed in a scanning near field microscope is formed of a material having a higher refractive index that the optical waveguide.

Because the tip of this optical microcantilever is formed of a material of a high refractive index, efficiency of irradiation of light from the microscopic aperture and/or the efficiency of generation of near field light to be detected and/or the efficiency of detection can be increased.

In order to achieve the aforementioned objects, an optical microcantilever according to a fifth embodiment comprises a substrate, a cantilever-shaped optical waveguide formed at the substrate, a tip, having a microscopic aperture at an end thereof, formed at a side of the free end of the cantilever, a light input/output end positioned at a side of the fixed end of the optical waveguide, and an optical element guide, formed on the substrate on the side of the light input/output end, for deciding a position of an optical element acting on light entering the optical waveguide and on light exiting from the optical waveguide, wherein the light input/output end projects above the optical element guide.

With this optical microcantilever, a distance between the light input/output end and the optical element can be made shorter because the light input/output end projects above the optical element guide. The efficiency with which light entering the optical waveguide and/or light outputted from the optical waveguide can be introduced and/or detected is therefore good.

In order to achieve the aforementioned objects, an optical microcantilever according to a sixth embodiment comprises a substrate, a cantilever-shaped optical formed at the substrate, a light input/output end positioned at a side of the fixed end of the optical waveguide, a tip provided at the side of the free end of the cantilever and having a microscopic aperture at an end thereof, and light-blocking means for ensuring that light scattered by the light input/output end is not transmitted in the direction of the tip.

Further, in the optical microcantilever of the sixth embodiment, the light-blocking means is arranged above the substrate and the optical waveguide, and provides a wall for blocking the scattered light.

Further, in the optical microcantilever of the sixth embodiment, the light-blocking means comprises a light-blocking agent located ont eh substrate an the optical waveguide and a light-blocking film located on the light-blocking agent, and the light-blocking film is located in such a manner as to cover at least the light input/output end.

Further, in the optical microcantilever of the sixth embodiment, the light-blocking means comprises a light-blocking film located on the substrate and the optical waveguide and a light-blocking agent arranged so as to cover at least part of an end of the light-blocking film, and the light-blocking film is located in such a manner as to cover at least the light input/output end. Preferably, the light-blocking film is movable.

With this optical microcantilever, the light-blocking means ensures that light scattered by the light input/output end is not transmitted in the direction of the tip and this therefore improves the S/N ratio of optical images of the scanning near field microscope so that the scanning speed of the scanning near field microscope can be improved accordingly. Deciding of the position of the optical element and the light input/output end of the waveguide can be performed during observation because the light-blocking film is movable and positioning of the optical element can therefore be carried out in a precise and straightforward manner.

BRIEF DESCRIPTION OF THE DRAWINGS

FIG. 14 is a view illustrating the situation when an optical fiber is installed in an optical fiber guide of the optical microcantilever of FIG. 13.

FIG. 15 is a structural view of an optical microcantilever of a fifth embodiment of the present invention.

FIG. 16 is a view showing a method for manufacturing the optical microcantilever of the fifth embodiment of the present invention.

FIG. 20 is a view showing the situation when an optical fiber is fixed to the optical microcantilever of FIG. 19.

FIG. 25 is a structural view of an optical microcantilever of a ninth embodiment of the present invention.

FIG. 26 is a structural view of an optical microcantilever of a tenth embodiment of the present invention.

FIG. 27 is a structural view of an optical microcantilever of an eleventh embodiment of the present invention.

DETAILED DESCRIPTION OF THE PREFERRED EMBODIMENTS

The following is a detailed description, with reference to the appended drawings, of an optical microcantilever, a manufacturing method thereof, and an optical microcantilever holder of the present invention.

FIRST EMBODIMENT

Figure 1:
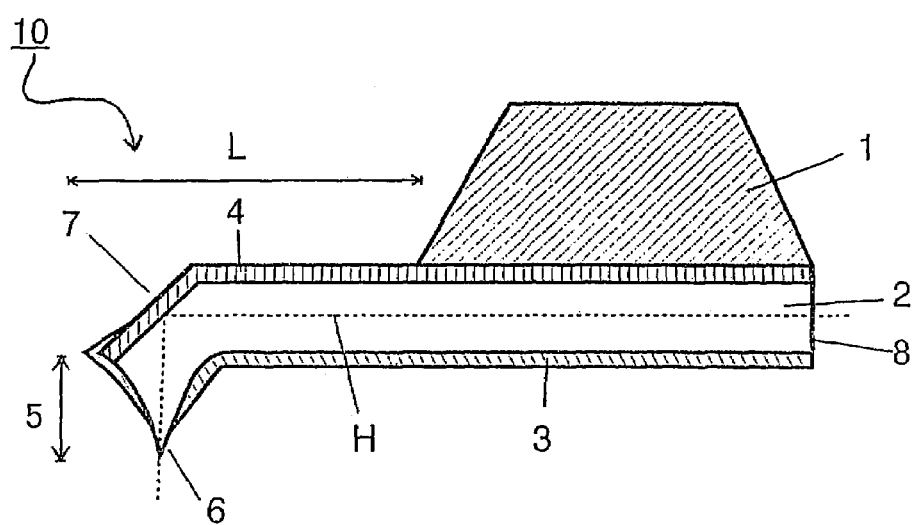
FIG. 1 is a side cross-section of an optical microcantilever of a first embodiment of the present invention.
Figure 2A:
FIG. 2 is a view illustrating a process for manufacturing the optical microcantilever of FIG. 1.
Figure 2B:
Figure 2C:
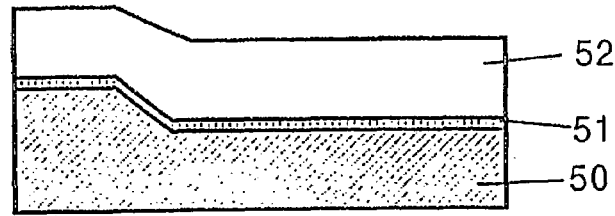
Figure 2D:
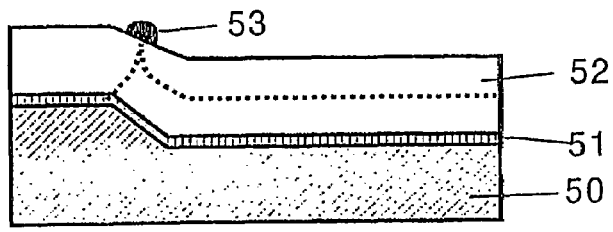
Figure 2E:
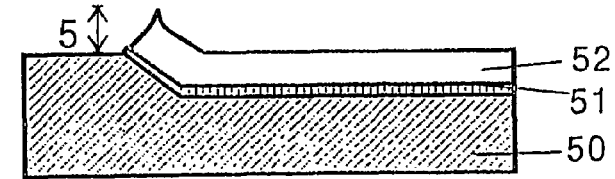
Figure 2F:
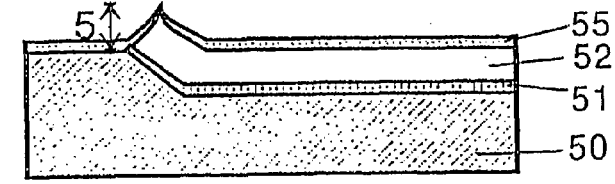
Figure 2G:
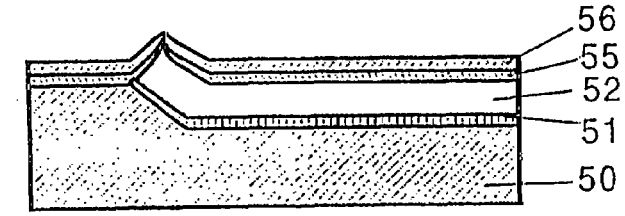
Figure 2H:
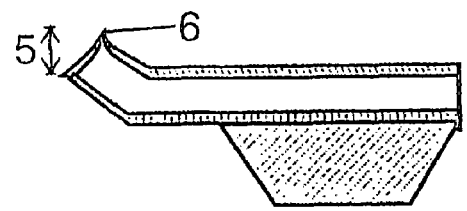

FIG. 1 is a side cross-section of an optical microcantilever of a first embodiment of the present invention. An optical microcantilever 10 comprises a support 1, an optical waveguide 2, a light-blocking film 3, a reflecting film 4, a pointed tip 5, a microscopic aperture 6 formed at the end of the tip 5, and a mirror 7. The end of the optical microcantilever 10 where the support 1 is formed is referred to as the light inputting/outputting end and the end where the tip 5 is formed is referred to as the free end.

The portion shown by L in FIG. 1 has a length of, for example, 50 to 1000 μm, a width of, for example, 10 to 100 μm, and a thickness of, for example, 4 to 10 μm. The height of the tip 5 is; for example, 5 to 10 μm. The radius of the end of the tip 5 is 50 nm or less and is equivalent to an AFM cantilever tip. The size of the microscopic aperture 6 is 100 nm or less. The support 1 is composed of silicon, glass, or quartz etc., the optical waveguide 2 is composed of silicon dioxide or polymide, etc., the light-blocking film 3 is composed of chromium, aluminum, or titanium, etc., and the reflecting film 4 is composed of a high reflectance material such as gold or aluminum, etc. The mirror 7 is part of the reflecting film 4.

Propagating light outputted from a light source (not shown) enters the optical waveguide 2 from the light input/output end 8 of the optical waveguide 2. The mirror 7 reflects propagating light H propagating from the light input/output end 8 so as to be guided towards the microscopic aperture 6. Near field light is then generated in the vicinity of the microscopic aperture 6 as a result of the propagating light H attempting to pass through the microscopic aperture 6. The propagating light can therefore be efficiently reflected towards the microscopic aperture 6 because the optical microcantilever 10 employs the mirror 7 to change the light path of the propagating light H and the loss of propagating light can therefore be reduced.

Next, a description is given, using FIG. 2, of a method for manufacturing the optical microcantilever 10. First, as shown in FIG. 2(*a*), a silicon substrate 50 is prepared, but if a mold is made this can also be a glass or quartz substrate. Next, as shown in FIG. 2(*b*), a step is formed in the silicon substrate 50 by anisotropic etching using a potassium hydroxide (KOH) or tetramethyl ammonium hydroxide (TMAH), and a mold is made. Next, as shown in FIG. 2(*c*), a reflecting film material 51 and a waveguide material 52 are deposited on the silicon substrate 50. The reflecting film material 51 is a high reflectance material such as gold or aluminum, and the waveguide material 52 is, for example, silicon dioxide or polymide, etc.

Next, as shown in FIG. 2(*d*), a mask 53 of photoresist material is formed at the location on the waveguide material 52 that is to be the tip 5. The waveguide material 52 is then removed along the dotted line in the drawing by dry or wet etching. As a result of this, the pointed tip 5 shown in FIG. 2(*e*) is formed. Unrequired portions of the reflecting film material 51 can be removed together with forming the tip or can be removed in a later process. Next, as shown in FIG. 2(*f*), a light-blocking film material 55 is deposited so as to cover the silicon substrate 50, the reflecting film material 51 and the waveguide material 52. The light-blocking film material 55 is made of, for example, chromium, aluminum or titanium, etc.

Next, as shown in FIG. 2(*g*), a mask 56 of photoresist material is formed on the waveguide material 55. The light-blocking film material 55 is then removed from the end of the tip 5 by dry or wet etching and the microscopic aperture 6 (refer to FIG. 2(*h*)) is formed. Finally, as shown in FIG. 2(*h*), the silicon substrate 50 that becomes the light input output end remains, and the optical microcantilever 10 is formed by etching off the silicon substrate 50 on the side of the free end.

The microscopic aperture 6 at the end of the tip 5 is formed at a position where light propagating in the waveguide material 52 is reflected towards the microscopic aperture 6 by the reflecting film material 51 deposited at the step of the silicon substrate 50.

Figure 3:
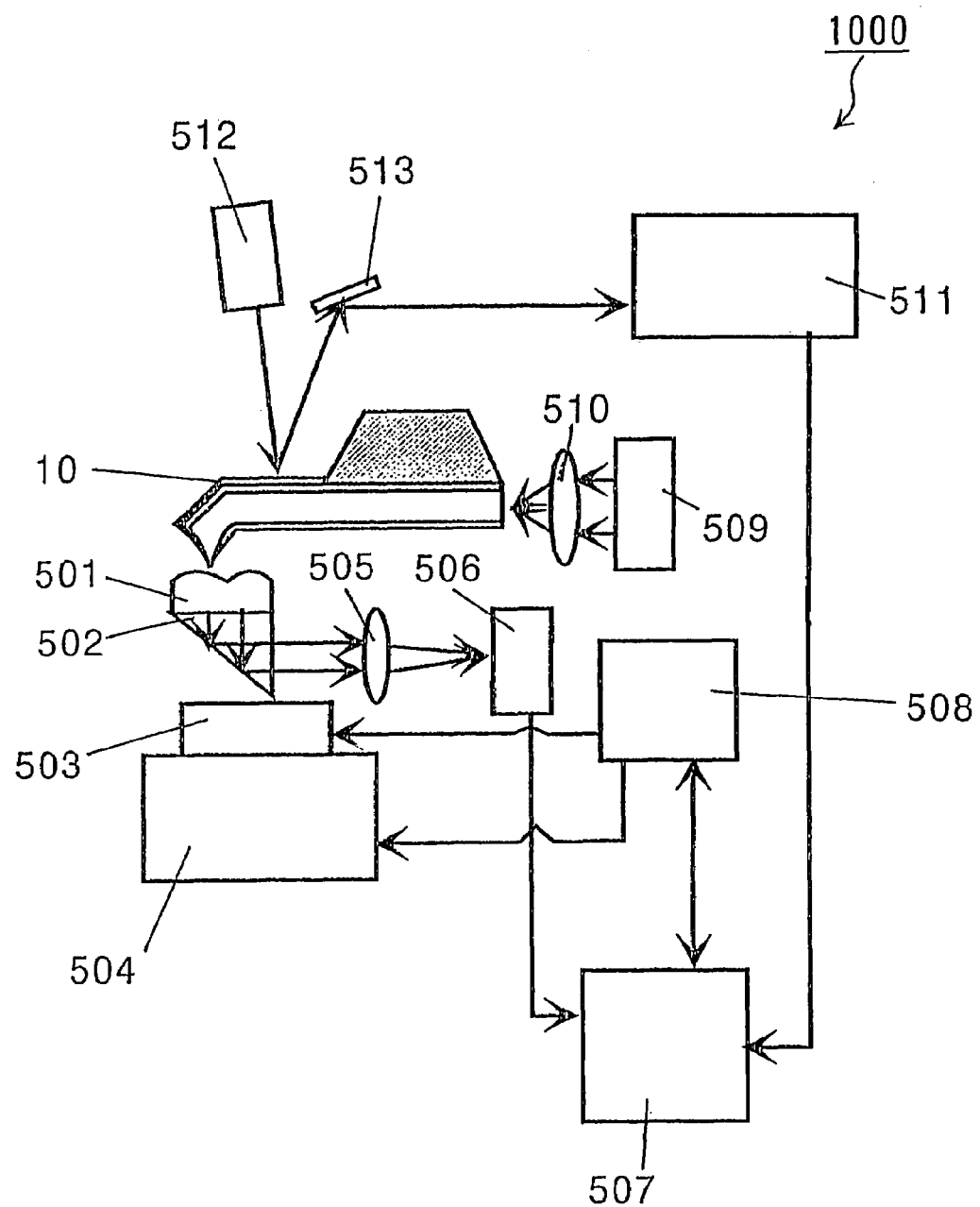
FIG. 3 is a structural view illustrating a scanning near field microscope employing the optical microcantilever of FIG. 1.

FIG. 3 is a view of a configuration of a scanning near field microscope employing the optical microcantilever 10. A scanning near field microscope 1000 comprises the optical microcantilever 10, a light source 509, a lens 510 for focussing light propagating from the light source 509 and irradiating this light to the light waveguide of the optical microcantilever 10, a prism 502 for reflecting propagating light obtained by scattering of near field light generated at the end of the optical microcantilever 10 located below a sample 501, a lens 505 for focussing light propagating from the prism 502, and a photodetector 506 for receiving propagating light focussed by the lens 505.

A laser oscillator 512 for generating laser light, a mirror 513 for reflecting laser light reflected at the free end of the optical microcantilever 10, and a photoelectric transducer 511 divided into upper and lower parts for receiving laser light reflected at the mirror 513 are provided above the optical microcantilever 10. A fine movement mechanism 503 and coarse movement mechanism 504 for controlling movement of the sample 501 and the prism 502 in three dimensions, a servo mechanism 508 for driving the fine movement mechanism 503 and the coarse movement mechanism 504, and a computer 507 for controlling the whole of the equipment are also provided. The scanning near field microscope 1000 can observe in a dynamic mode or a contact mode.

Next, a description is given of the operation of the scanning near field microscope 1000. Laser light generated by the laser oscillator 512 is reflected by the free end of the optical microcantilever 10. The optical microcantilever 10 then shifts due to interatomic force between the end of the optical microcantilever 10 and the sample 501. The angle of reflection of laser light reflected by the free end of the optical microcantilever 10 then shifts and this shift is detected by the photoelectric transducer 511, with a signal detected by the photoelectric transducer 511 being sent to the computer 507. The computer 507 controls the approach of the optical microcantilever 10 to the sample 501 and controls the fine movement mechanism 503 and the coarse movement mechanism 504 using the servo mechanism 508 in such a manner that deflection of the optical microcantilever 10 while scanning the surface does not exceed a set value.

Further, propagating light outputted from the light source 509 is focused by the lens 510 and irradiated to the microscopic aperture via the optical waveguide of the optical microcantilever 10 so that near field light is generated in the vicinity of the microscopic aperture of the optical microcantilever 10. Optical information of the sample 501 reflected by the prism 502 is focussed by the lens 505 and guided towards the photodetector 506. The computer 507 receives the signal from the photodetector 506, detects optical information of the sample.501 from this signal, and makes a topographical image and optical image.

According to the optical microcantilever 10 of the first embodiment, propagating light H can be efficiently converted to near field light because propagating light H propagating from the light input/output end 8 of the optical waveguide 2 is reflected by the mirror 7 so as to be guided to the microscopic aperture 6, and loss of propagating light can therefore be reduced. Further, it is also possible to obtain high resolution topographical images and optical images because the tip 5 is pointed and the microscopic aperture can be made small. Moreover, loss of propagating light can be further reduced and near field light of substantial intensity can be generated because the distance from the mirror 7 to the microscopic aperture 6 is short. Handling is also straightforward because the overall size is small.

Further, according to the method of manufacturing the optical microcantilever 10 of the first embodiment, the mirror 7 for reflecting the propagating light H from the light input/output end towards the microscopic aperture 6 can be formed and the optical microcantilever 10 where loss of propagating light is reduced can be easily made. Further, batch processing is possible for the steps shown in FIG. 2 by employing silicon processing, and optical microcantilevers with superior productivity and uniformity can therefore be made.

In the above, a optical waveguide 2 of a single layer structure is shown in the drawings. However, the optical waveguide 2 may also have a two layer structure of a core of a high refractive index and cladding of a low refractive index, or a three layer structure, or a structure where the surroundings of the core are covered in cladding, so that leaking of propagating light to the outside is prevented. Further, at least part of the optical waveguide 2 may have a two layer structure of a core of a high refractive index and cladding of a low refractive index, or a three layer structure, or a structure where the surroundings of the core are covered in cladding. The same can also be said for the structure of the optical waveguide 2 in the following embodiments. Still further, in the above a description is given where the mirror 7 reflects the propagating light H propagating from the light input/output end 8 towards the microscopic aperture 6 but reflection of propagating light H propagating from the microscopic aperture 6 towards the light input/output end 8 by the mirror 7 is also possible.

SECOND EMBODIMENT

Figure 4:
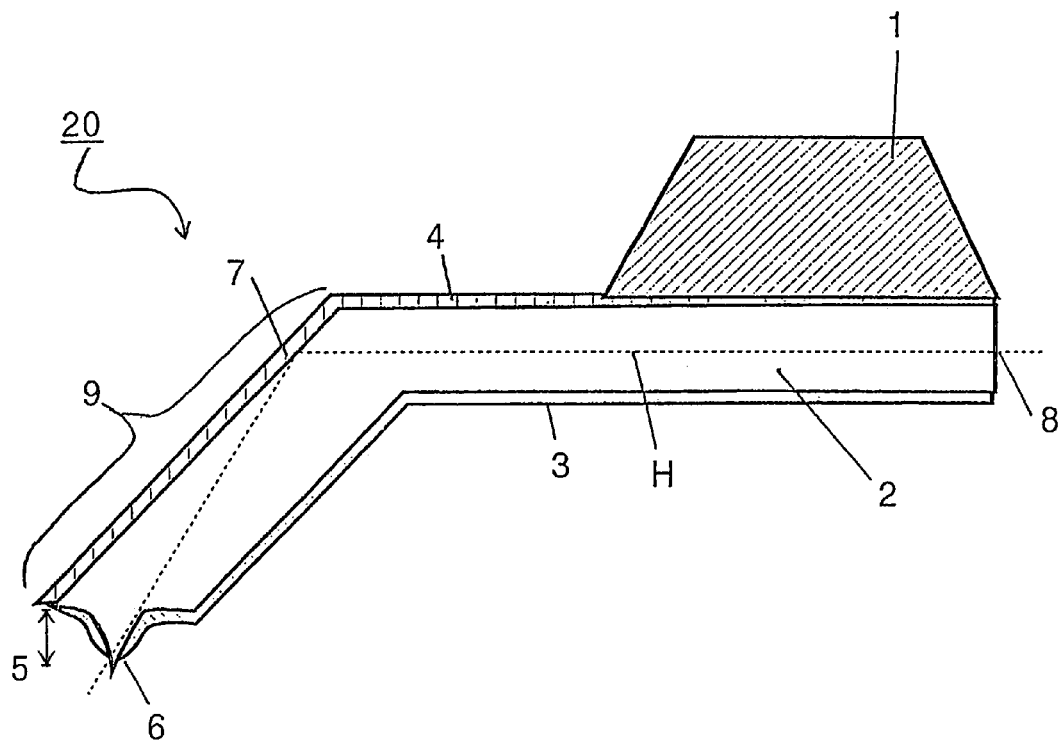
FIG. 4 is a side cross-section of an optical microcantilever of a second embodiment of the present invention.

FIG. 4 is a side cross-section of an optical microcantilever of a second embodiment of the present invention. Here, a nose section 9 is formed at the optical microcantilever 20 at an angle with respect to an optical axis of propagating light propagating at the light input/output end 8 of the optical waveguide 2, and the tip 5 is formed at the end of this nose section 9. Other aspects of the configuration are the same as the configuration for the optical microcantilever 10 of the first embodiment and are not described.

The nose section 9 is, for example, 1 to 200 μm long, and other dimensions of the optical microcantilever 20 are the same as for the optical microcantilever 10 of the first embodiment. This nose section 9 can be formed by preparing a thick silicon substrate 50 and forming the step formed in FIG. 2(*b*) so as to be long. The manufacturing steps thereafter are the same as the manufacturing steps shown in FIG. 2(*c*) to FIG. 2(*h*). This optical microcantilever 20 is then employed in place of the optical microcantilever 10 of the scanning near field microscope 1000 of FIG. 3.

Propagating light generated by a light source (not shown) enters the optical waveguide 2 from the light input/output end 8 of the optical waveguide 2. The mirror 7 reflects propagating light H propagating from the light input/output end 8 so as to be guided towards the microscopic aperture 6. Near field light is then generated in the vicinity of the microscopic aperture 6 as a result of the propagating light H attempting to pass through the microscopic aperture 6. The propagating light can therefore be efficiently reflected towards the microscopic aperture 6 because the optical microcantilever 20 employs the mirror 7 to change the light path of the propagating light H and the loss of propagating light can therefore be reduced.

According the optical microcantilever 20 of the second embodiment, propagating light H can be efficiently reflected towards the microscopic aperture 6 because propagating light H propagating from the light input/output end 8 of the optical waveguide 2 is reflected by the mirror 7 so as to be guided to the microscopic aperture 6, and loss of propagating light can therefore be reduced. Observation of surfaces of materials having substantial steps is therefore made possible by providing the long nose section 9.

THIRD EMBODIMENT

Figure 5:
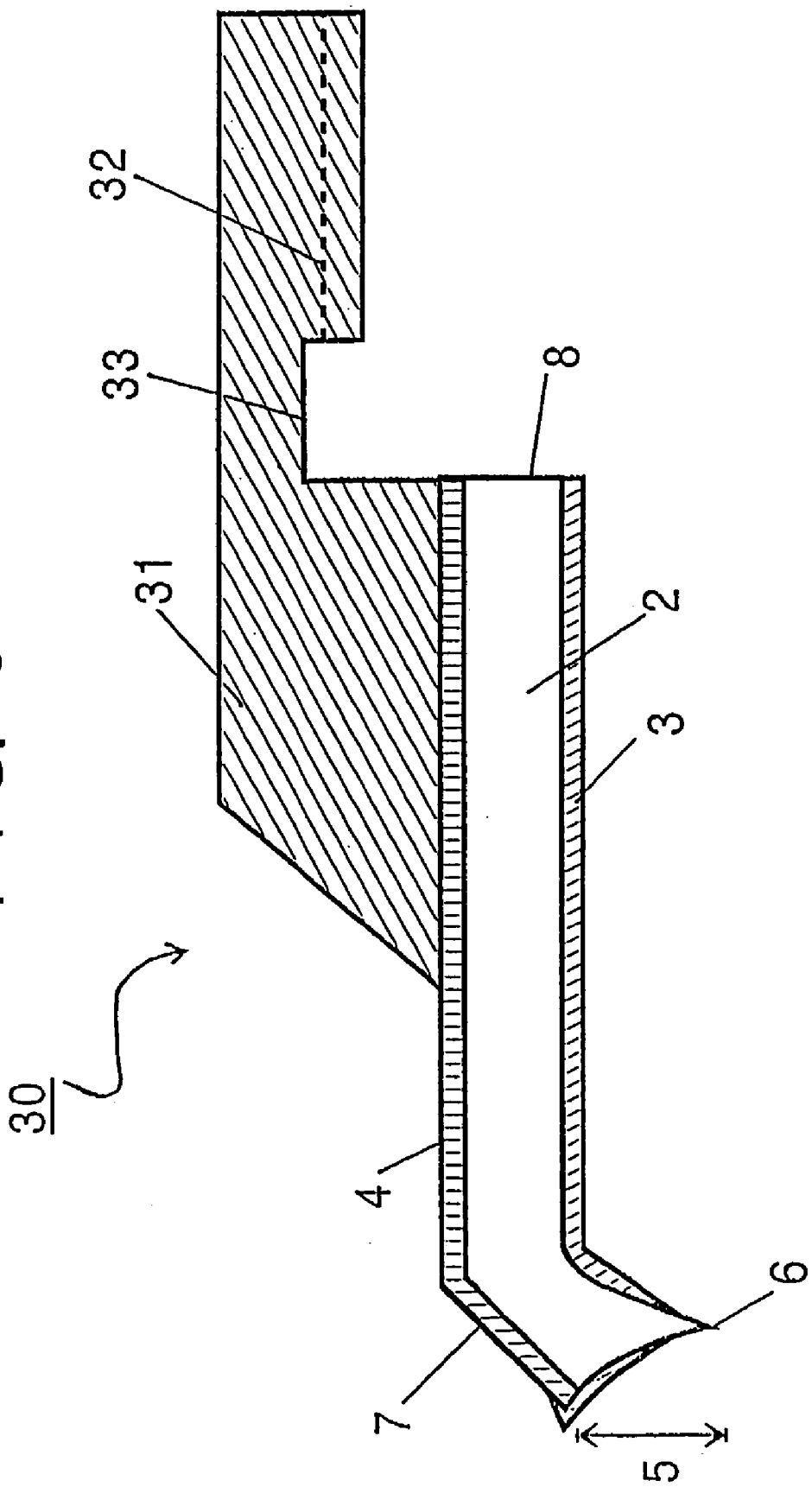
FIG. 5 is a side cross-section of an optical microcantilever of a third embodiment of the present invention.

FIG. 5 is a side cross-section of an optical microcantilever of a third embodiment of the present invention. This optical microcantilever 30 comprises an optical fiber guide channel 32 for supporting an optical fiber, and a channel 33 formed between the optical fiber guide channel 32 and the light input/output end 8 of the optical waveguide 2, formed at a support section 31. The optical fiber guide channel 32 is, for example, a V-shaped groove. Other aspects of the configuration are the same as the configuration for the optical microcantilever 10 of the first embodiment and are not described. In addition to the optical fiber, an optical element acting on light entering the optical waveguide and acting on light exiting from the optical waveguide can be, for example, a light-emitting diode, a semiconductor laser, a lens, a beam splitter, or a photodiode, etc. In this case, the optical fiber guide channel 32 is an optical element guide made to correspond to the states of the respective elements.

Figure 6:
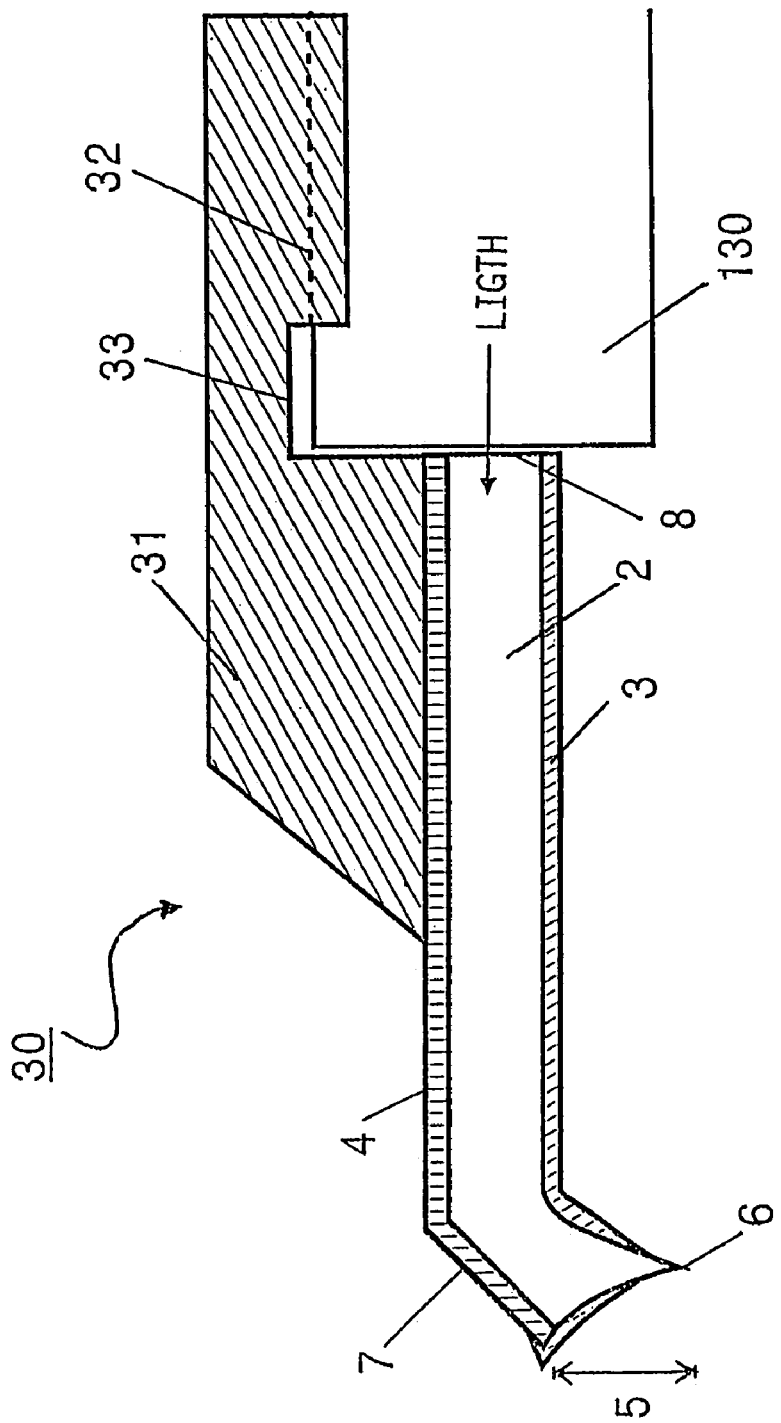
FIG. 6 is a view illustrating the situation when an optical fiber is installed in an optical element guide of the optical microcantilever of FIG. 5.

FIG. 6 shows the situation when an optical fiber 130 is fixed to the optical fiber guide channel 32 of the optical microcantilever 30. Light propagating from the optical fiber 130 enters the optical waveguide 2 via the light input/output end 8 and is guided to the microscopic aperture 6 by the optical waveguide 2. There is therefore little trouble involved in aligning the optical microcantilever 30 and the optical fiber 130 during changing, etc., because the optical fiber guide channel 32 is formed in the optical microcantilever 30. Because a deep channel 33 is formed between the light input/output end 8 and the optical fiber guide channel 32, an inclined surface (refer to FIG. 14) that provided an obstacle in the related art no longer provides an obstacle, and the optical fiber 130 can therefore be brought close to the light input/output end 8. Coupling loss between the optical fiber 130 and the optical waveguide 2 can therefore be reduced, the intensity of propagating light entering the optical waveguide 2 can be made more substantial, and near field light of a stronger intensity can be generated from the microscopic aperture 6.

Next, a description is given, using FIG. 7 and FIG. 8, of a method for manufacturing the optical microcantilever 30. First, as shown in FIG. 7(a), a silicon substrate 70 is prepared, but if a mold is made this can also be a glass or quartz substrate. Next, as shown in FIG. 7(b), steps 71 and 72 and the optical fiber guide channel 32 are formed at the silicon substrate 70 by anisotropic etching using KOH or TMAH, and a mold is made. Then, as shown in FIG. 7(c), a reflecting film material 74 and a waveguide material 75 are deposited on the silicon substrate 70. The reflecting film material 74 is a high reflectance material such as gold or aluminum, and the waveguide material 75 is, for example, silicon dioxide or polymide, etc.

Figure 7A:
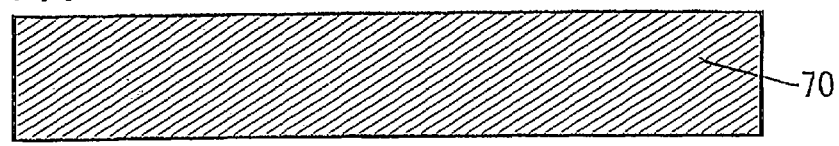
FIG. 7 is a view illustrating a process for manufacturing the optical microcantilever of FIG. 5.
Figure 7B:
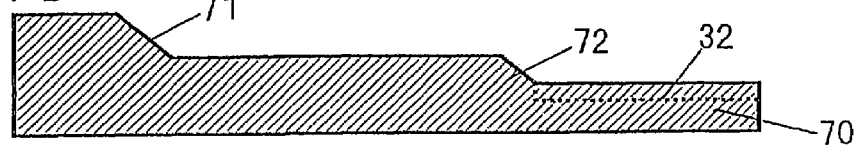
Figure 7C:
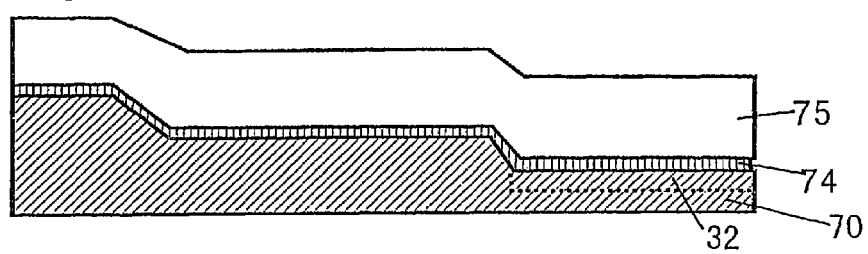
Figure 7D:
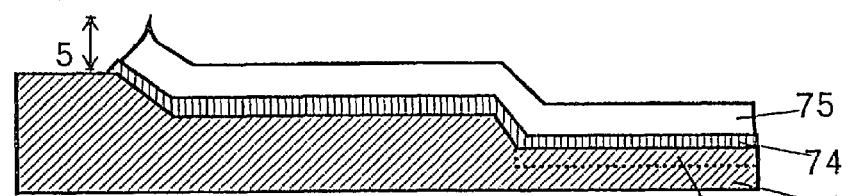
Figure 7E:
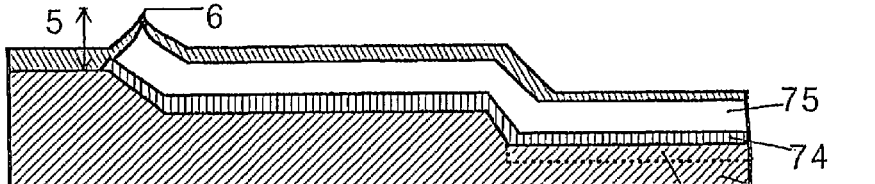
Figure 7F:
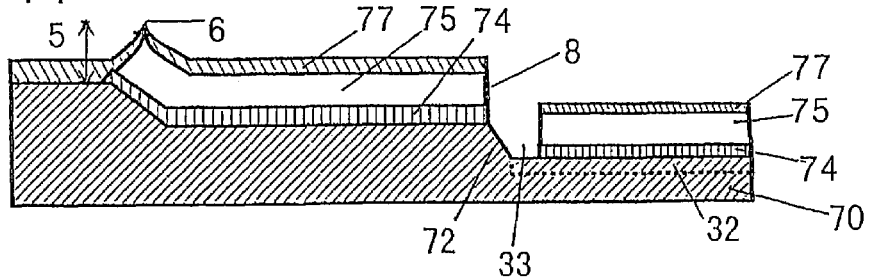

After this, as shown in FIG. 7(d), waveguide material 75 deposited on the step 71 is removed by dry or wet etching and a pointed tip 5 is formed. Then, as shown in FIG. 7(e), a light-blocking film material 77 is deposited so as to cover the silicon substrate 70, the reflecting film material 74 and the waveguide material 75. The light-blocking film material 77 is then removed from the end of the tip 5 by dry or wet etching and the microscopic aperture 6 is formed. After this, as shown in FIG. 7(f), light-blocking film material 77, waveguide material 75 and reflecting film material 74 deposited on the step 72 is removed by dry or wet etching and the light input/output end 8 is formed.

Figure 8G:
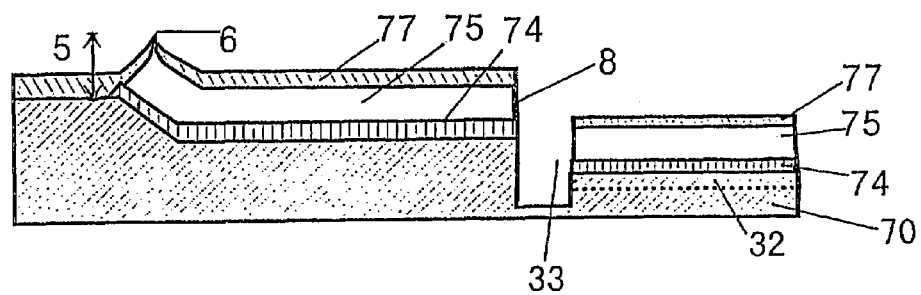
FIG. 8 is a view illustrating a process for manufacturing the optical microcantilever of FIG. 5.
Figure 8H:
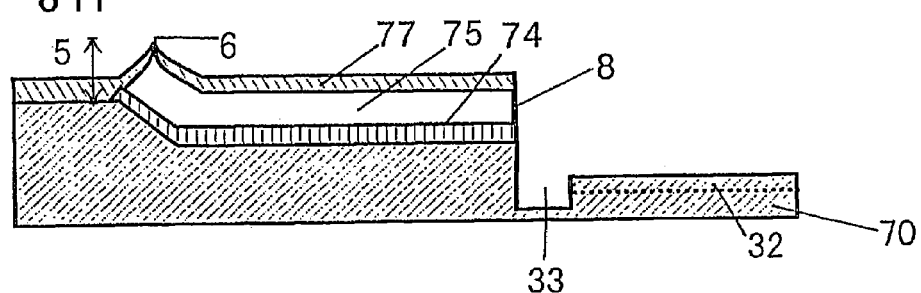
Figure 8I:
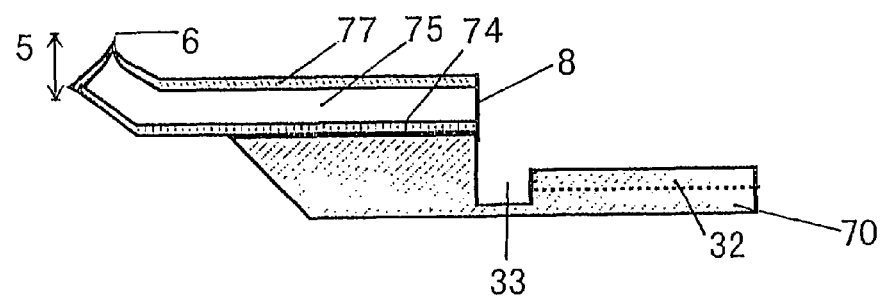

After this, as shown in FIG. 8(g), the silicon substrate 70 is removed from between the light input/output end 8 and the optical fiber guide channel 32 by dry or wet etching and the channel 33 deeper than the optical fiber guide channel 73 is formed. Next, as shown in FIG. 8(h), reflecting film material 74, waveguide material 75 and light-blocking film material 77 deposited on the optical fiber guide channel 32 is removed by dry or wet etching so that the optical fiber guide channel 32 is exposed. Finally, as shown in FIG. 8(i), the silicon substrate 70 that becomes the light input output end remains, and the optical microcantilever 30 is formed by etching off the silicon substrate 70 on the side of the free end.

According to the optical microcantilever 30 of the third embodiment, there is little trouble involved in aligning the optical microcantilever 30 and the optical fiber 130 during changing, etc., because the optical fiber guide channel 32 is formed. Further, by forming the deep channel 33 between the light input/output end 8 and the optical fiber guide channel 32, the optical fiber 130 can be located close to the light input/output end 8, propagating light of increased intensity and reduced coupling loss can be introduced at the optical waveguide 2, and near field light of substantial intensity can be generated from the microscopic aperture 6.

This optical microcantilever 30 is employed in place of the optical microcantilever 10 of the scanning near field microscope 1000 of FIG. 3. In this case, propagating light focussed by the lens 510 is guided to the optical waveguide of the optical microcantilever 30 via the optical fiber.

Further, according to the method of manufacturing the optical microcantilever 30-of the third embodiment, the optical microcantilever 30 with the deep channel 33 formed between the light input/output end 8 and the optical fiber guide channel 32 can be manufactured in a straightforward manner. Further, batch processing is possible for the manufacturing steps shown in FIG. 7 and FIG. 8 by employing silicon processing, and optical microcantilevers with superior productivity and uniformity can therefore be made.

FOURTH EMBODIMENT

Figure 9:
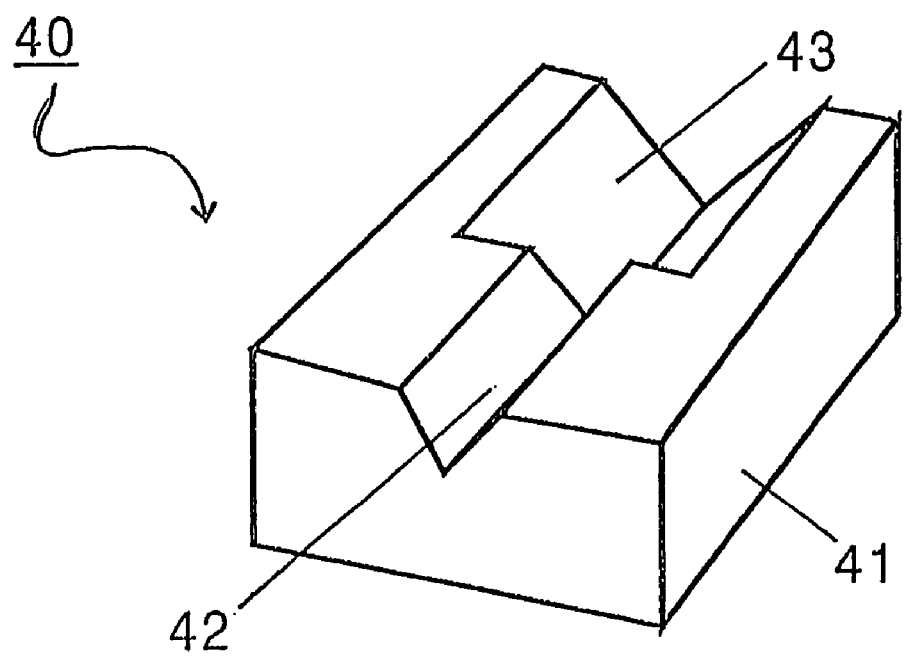
FIG. 9 is a schematic view of an optical microcantilever of a fourth embodiment of the present invention.

FIG. 9 is a side cross-section of an optical microcantilever holder of a fourth embodiment of the present invention. V-shaped guide channels 42 and 43 are formed in a substrate 41 of silicon, stainless steel or plastic of this optical microcantilever holder 40, and the guide channel 43 is deeper than the guide channel 42.

Figure 10:
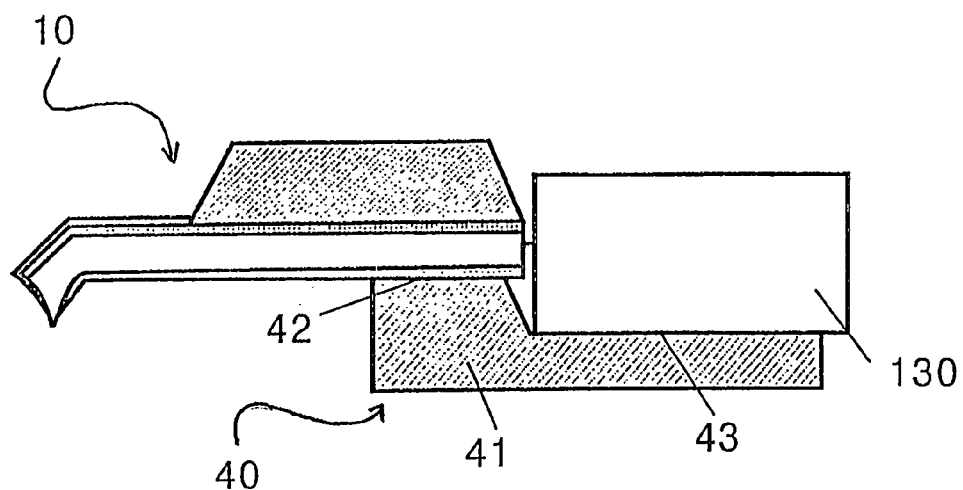
FIG. 10 is a view illustrating the situation when an optical microcantilever and an optical fiber are installed at the optical microcantilever holder of FIG. 9.
Figure 11:
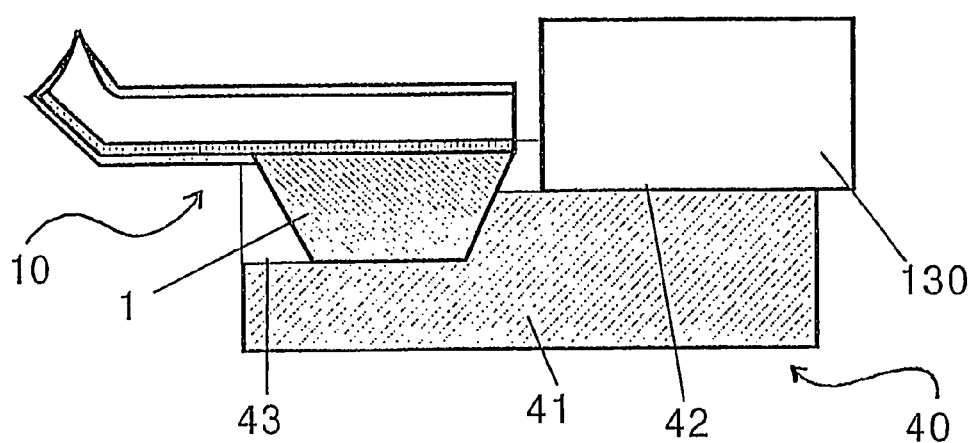
FIG. 11 is a view illustrating the situation when an optical microcantilever and an optical fiber are installed at the optical microcantilever holder of FIG. 9.
Figure 12:
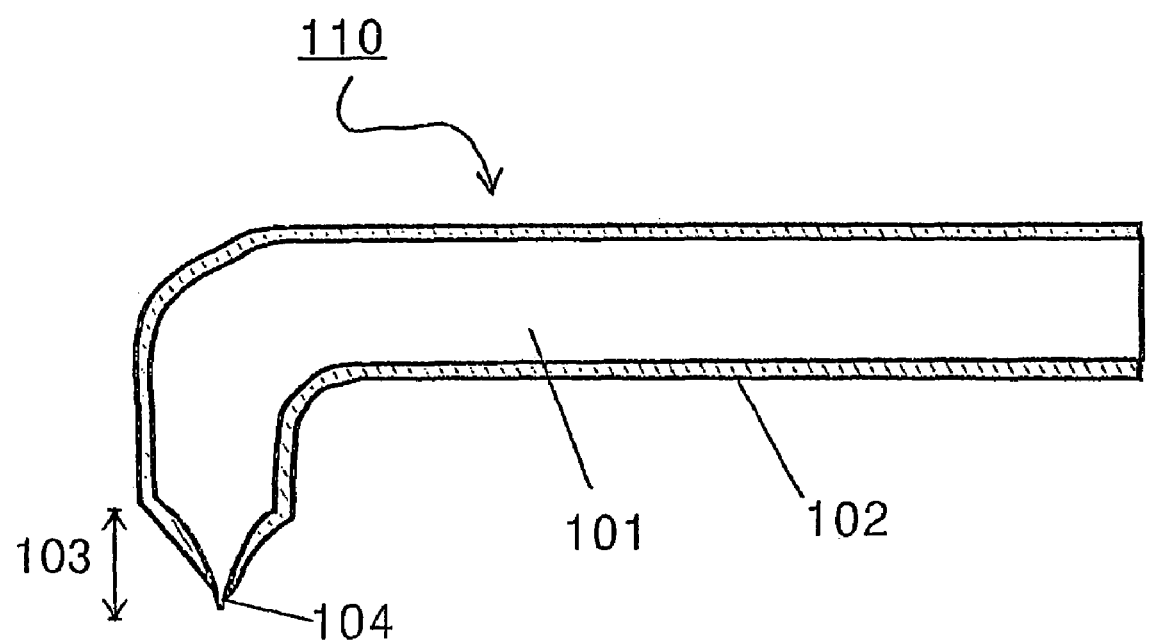
FIG. 12 is a side cross-section of a related example of an optical fiber probe.
Figure 13:
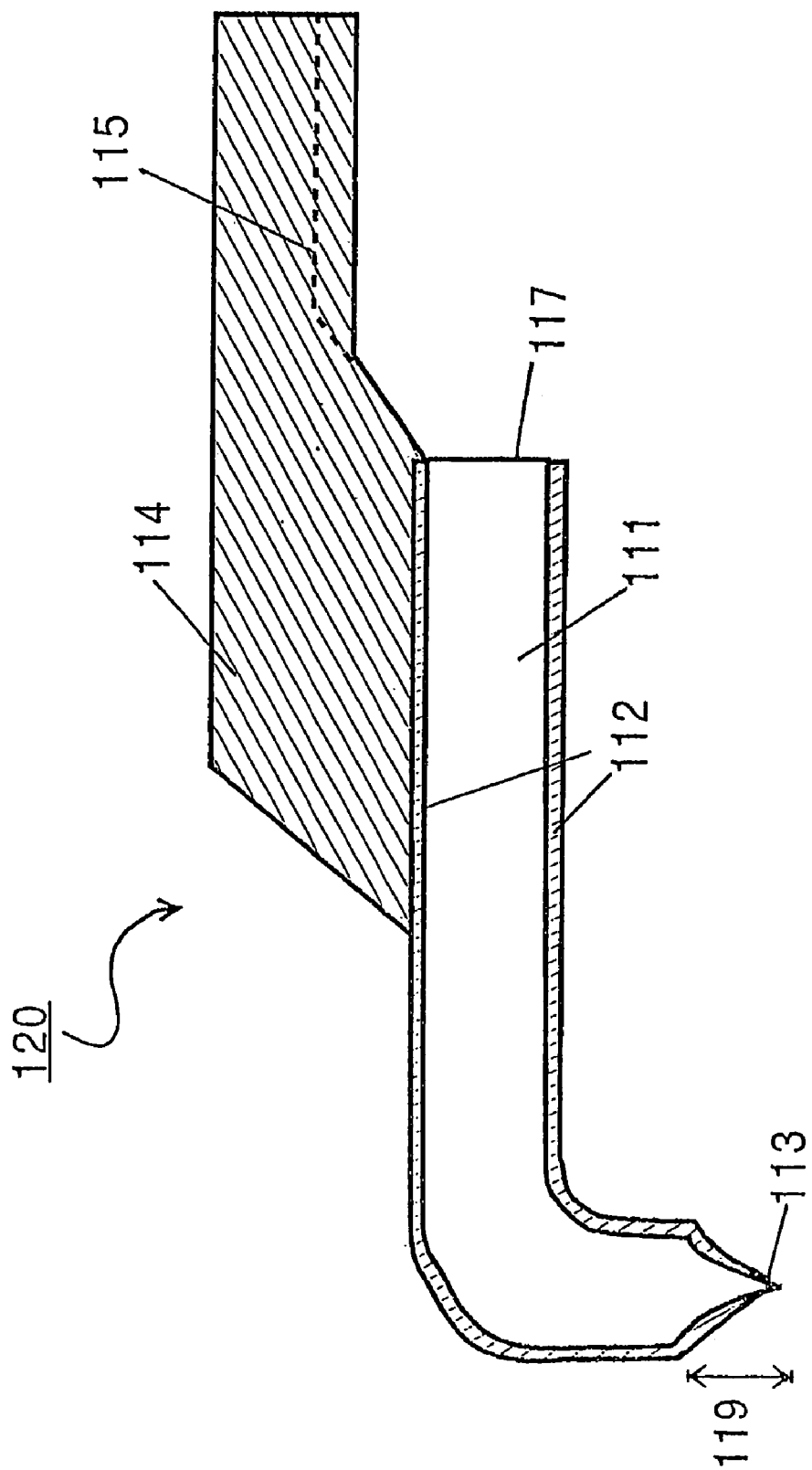
FIG. 13 is a side cross-section of a related optical microcantilever having an optical fiber guide channel.

FIG. 10 and FIG. 11 show the situation when the optical microcantilever 10 of the first embodiment and the optical fiber 130 are installed at the optical microcantilever holder 40. In FIG. 10, the optical waveguide of the optical microcantilever 10 is installed in the guide channel 42 and the optical fiber 130 is installed in the guide channel 43. On the other hand, in FIG. 11, the optical fiber 130 is installed in the guide channel 42 and the optical microcantilever 10 is installed in the guide channel 43. In the situation shown in FIG. 11 the tip of the optical microcantilever 10 is located on the opposite side to the optical microcantilever holder 40. It is therefore easier for the tip to be made closer to the surface of the sample than in the situation shown in FIG. 10 by the portion by where the substrate 41 does not exist between the sample and the tip. In addition to the optical fiber 130, an optical element acting on light entering the optical waveguide and acting on light exiting from the optical waveguide can be, for example, a light-emitting diode, a semiconductor laser, a lens, a beam splitter, or a photodiode, etc. In this case, the guide channel 42 and the guide channel 43 are optical element guides made to correspond to the states of the respective elements.

According the optical microcantilever holder 40 of the fourth embodiment, two guide channels are provided, with the optical microcantilever being installed in one guide channel and the optical fiber being installed in the other guide channel. This keeps the trouble involved in aligning the optical microcantilever and optical fiber during changing etc., to a minimum.

FIFTH EMBODIMENT

FIG. 15 is a structural view of an optical microcantilever 80 of a fifth embodiment of the present invention. This optical microcantilever 80 has a head 81 at the end of the nose section 9 of the optical microcantilever 20 described for the second embodiment of the present invention. The head 81 has the tip 5, and the microscopic aperture 6 is formed at the end of the tip 5. The head 81 is 10 to 100 μm long, and other aspects of the configuration are the same as the configuration for the optical microcantilever 10 of the first embodiment and are not described.

Propagating light generated by a light source (not shown) enters the optical waveguide 2 from the light input/output end 8. The mirror 7 reflects propagating light H propagating from the light input/output end 8 so as to be guided-towards the head 81. Near field light is generated in the vicinity of the microscopic aperture 6 due to the component of the propagating light guide towards the head 81 attempting to pass through the microscopic aperture 6. The propagating light can therefore be efficiently reflected towards the microscopic aperture 6 because the optical microcantilever 20 employs the mirror 7 to change the light path of the propagating light H and the loss of propagating light can therefore be reduced.

FIG. 16 is a view illustrating a method of manufacturing the optical microcantilever 80. In a method for manufacturing the optical microcantilever 80 having the head 81, as shown in FIG.16(*a*), reflecting film material 51 and waveguide material 52 is deposited on a step formed at the silicon substrate 50. Next, as shown in FIG. 16(*b*), a mask 53 is formed at the step formed at the silicon substrate 50, and the tip 5 is formed by wet etching. The manufacturing steps thereafter are the same as the manufacturing steps shown in FIG. 2(*e*) to FIG. 2(*h*). This optical microcantilever 80 is employed in place of the optical microcantilever 10 of the scanning near field microscope 1000 of FIG. 3.

As described above, according to the optical microcantilever 80, in addition to the effects described for the second embodiment, the shape of the photomask used in photolithographic processing can be transferred in an accurate manner as a result of forming the tip 5 on the upper side of the step formed at the silicon substrate 50 in the manufacturing step. This means that the shape of the tip 5 of the optical microcantilever 80 can be controlled in a superior manner.

SIXTH EMBODIMENT

Figure 17:
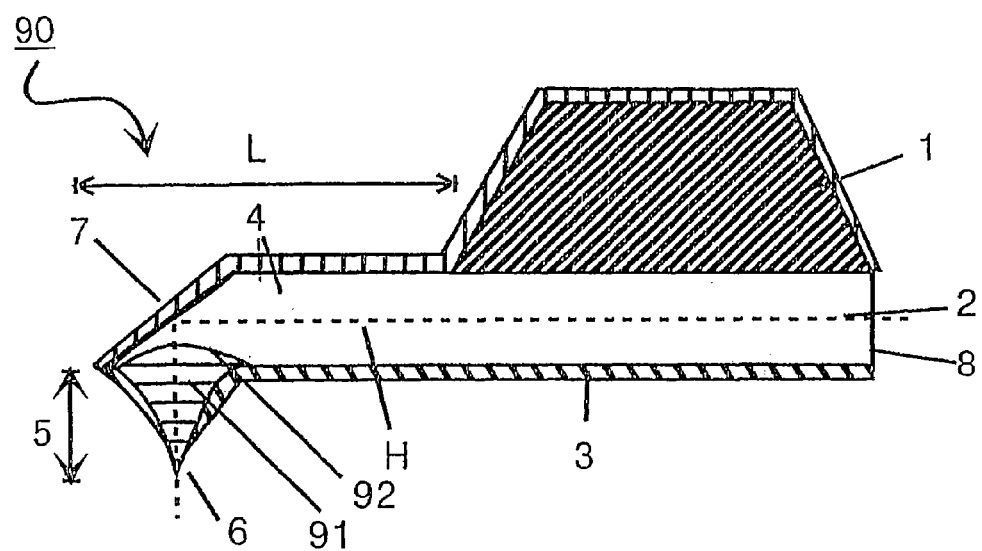
FIG. 17 is a structural view of an optical microcantilever of a sixth embodiment of the present invention.
Figure 18A:
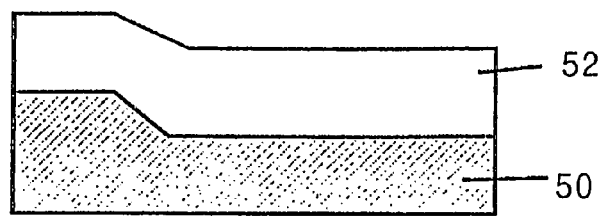
FIG. 18 is a view showing a method for manufacturing the optical microcantilever of the sixth embodiment of the present invention.
Figure 18B:
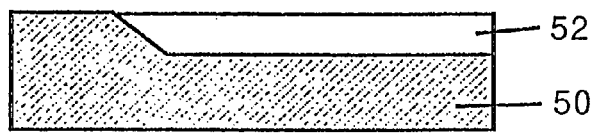
Figure 18C:
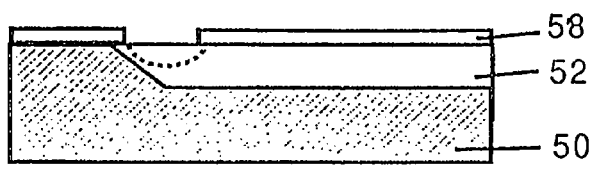
Figure 18D:
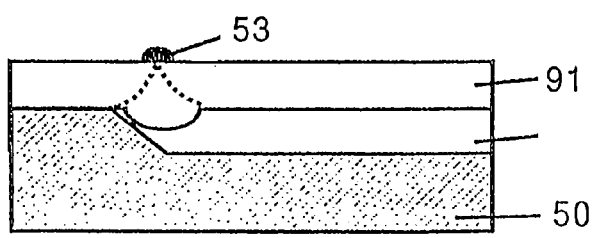

FIG. 17 is a structural view of an optical microcantilever 90 of a sixth embodiment of the present invention. The tip 5 of the optical microcantilever 90 is composed of tip material 91 having a higher refractive index than the material composing the optical waveguide 2 and a lens 92 is provided at the surface boundary of the optical waveguide 2 and the tip material 91. The lens 92 can comprise a convex lens and fresnel lenses etc. as shown in FIG. 17. The optical waveguide 2 of the optical microcantilever 90 is formed directly on the support 1. The reflecting film 7 of this optical microcantilever 90 can also be formed between the support 1 and the optical waveguide 2, as with the optical microcantilever 10. The same can also be said for the presence of the reflecting film 7 between the support 1 and the optical waveguide 2 in the preceding and subsequent embodiments. Other aspects of the configuration are the same as for the optical microcantilever 10 and are not described.

FIG. 18 is a view illustrating step of manufacturing the optical microcantilever 90. In the method described in FIG. 2(*a*) and FIG. 2(*b*), waveguide material 52 is deposited on the silicon substrate 50 where the step is formed, as shown in FIG. 18(*a*). Then, as shown in FIG. 18(*b*), the waveguide material 52 is flattened by methods such as polishing, grinding, or etching, etc. Next, as shown in FIG. 18(*c*), a mask 58 of photoresist is first formed and a concave shape for forming a convex lens is formed in the waveguide material using a method such as wet etching. Next, as shown in FIG. 18(*d*), tip material 91 is deposited by a technique such as CVD, sputtering or spin coating, etc., a mask 53 is formed at the position where the tip 5 is to be formed, and the tip 5 is formed from the tip material using an anisotropic etching process such as wet or dry etching. In the step described in FIG. 18(*c*), a Fresnel lens, can be formed at the surface boundary of the tip 5 and the optical waveguide 2 by forming a Fresnel lens shape on the waveguide material 52. In the step described in FIG. 18(*c*), a gradient-index lens can be formed by giving the vicinity of the surface of the waveguide material 52 a gradient-index using a method such as injecting the waveguide material 52 with ions, etc. The steps thereafter are the same as for the manufacturing method described in FIG. 2(*e*) to FIG. 2(*h*), and are therefore not described. Finally, after the step described in FIG. 2(*h*), the reflecting film or reflector 7 is formed by methods such as sputtering or vacuum deposition from the side of the support 1.

In FIG. 17, propagating light generated by a light source (not shown) enters the optical waveguide 2 from the light input/output end 8. The reflector or mirror 7 reflects propagating light H propagating from the light input/output end 8 so as to be guided towards the lens 92. The propagating light H is focussed in the vicinity of the microscopic aperture 6 by the lens 92 and near field light is generated in the vicinity of the microscopic aperture 6 by propagating light H attempting to pass through the microscopic aperature 6. With the optical microcantilever 90, light of a high energy density focused by the lens 92 can be guided towards the microscopic aperture 6 and the intensity of near field light irradiated from the microscopic aperture 6 can therefore be made substantial.

This optical microcantilever 90 is employed in place of the optical microcantilever 10 of the scanning near field microscope 1000 of FIG. 3.

According to the optical microcantilever 90 described above, in addition to the effects described for the first embodiment, the intensity of near field light irradiated from the microscopic aperture 6 is greater than for the optical microcantilever 10 and the S/N ration of an optical signal obtained by the scanning near field microscope 1000 can therefore be improved so that the scanning speed of the scanning near field microscope can be improved accordingly.

SEVENTH EMBODIMENT

Figure 19:
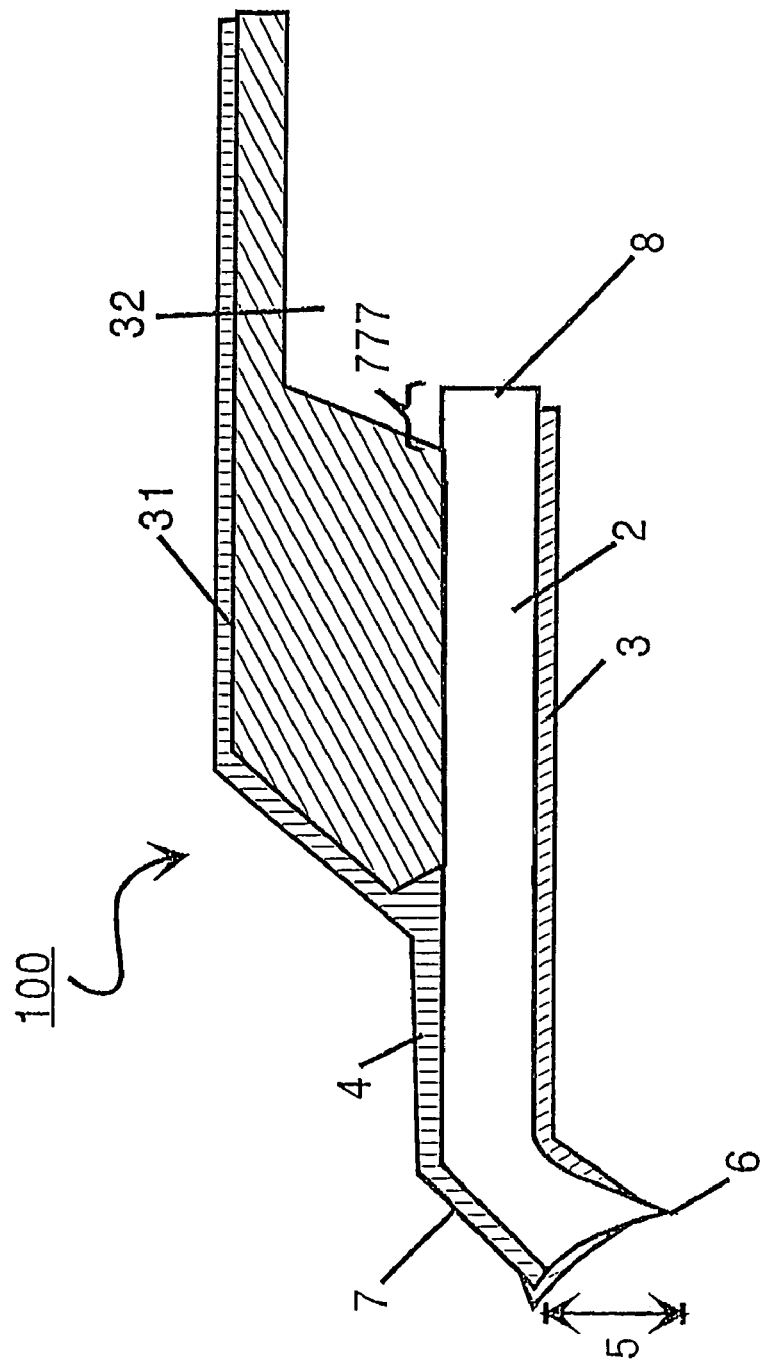
FIG. 19 is a structural view of an optical microcantilever of a seventh embodiment of the present invention.
Figure 21A:
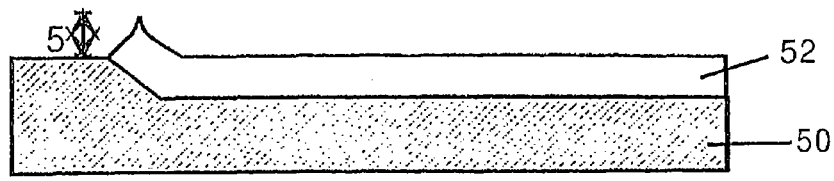
FIG. 21 is a view showing a method for forming a projecting section of the optical microcantilever of FIG. 19.
Figure 21B:
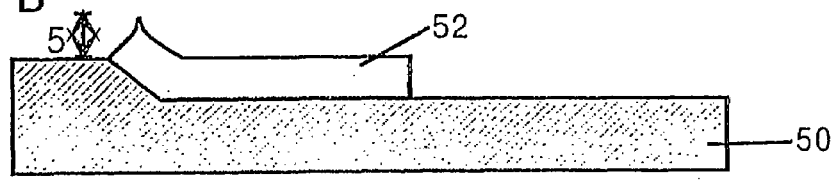
Figure 21C:
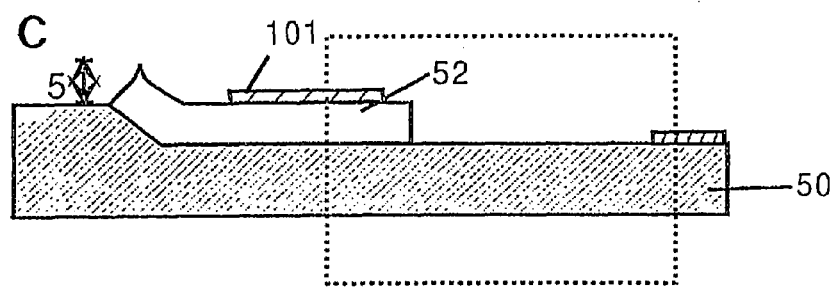
Figure 21D:
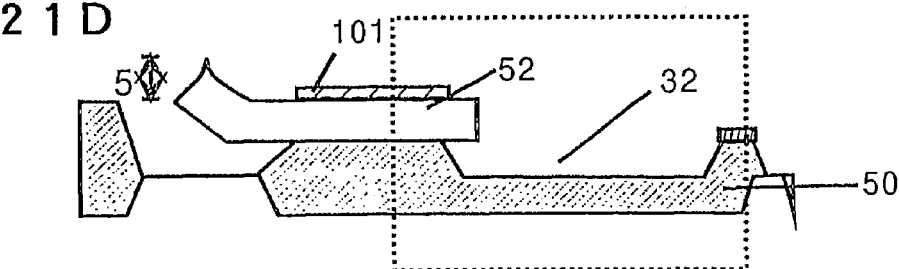
Figure 21E:
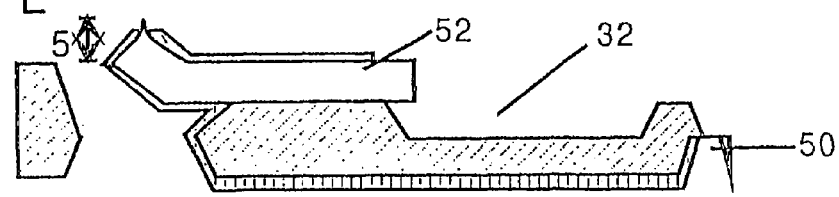
Figure 22A:
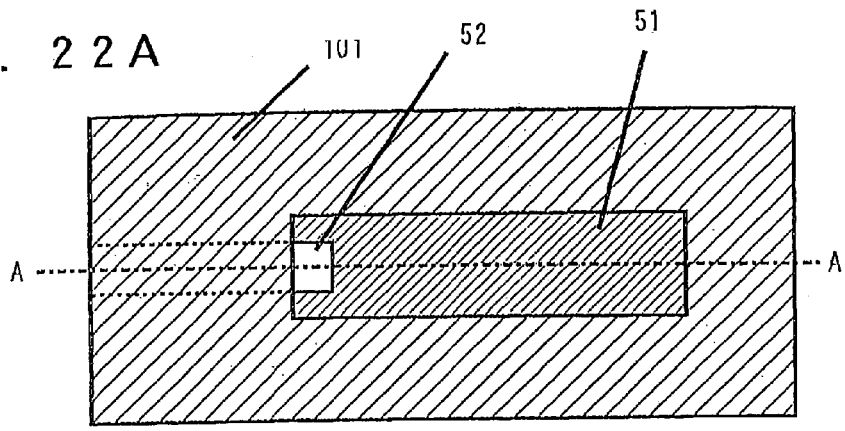
FIG. 22 is a further view showing a method for forming a projecting section of the optical microcantilever of FIG. 19.
Figure 22B:
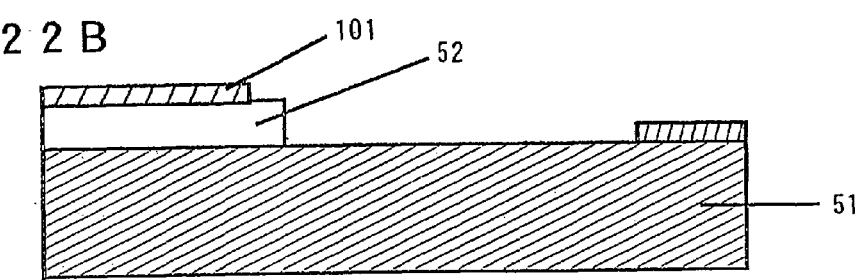
Figure 22C:
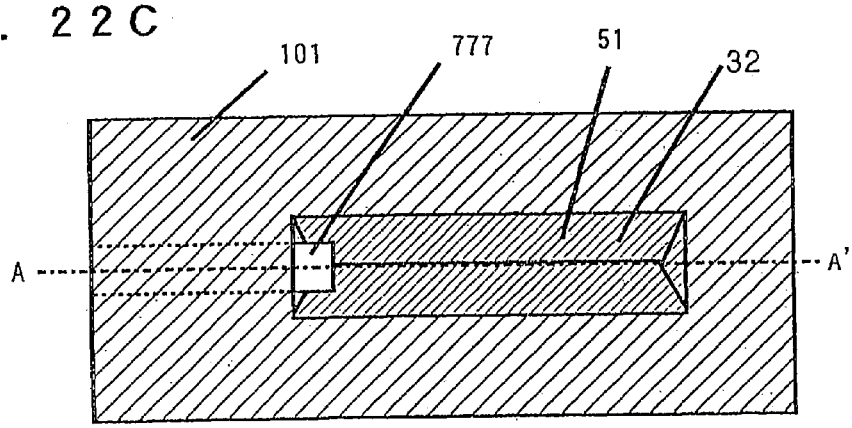
Figure 22D:
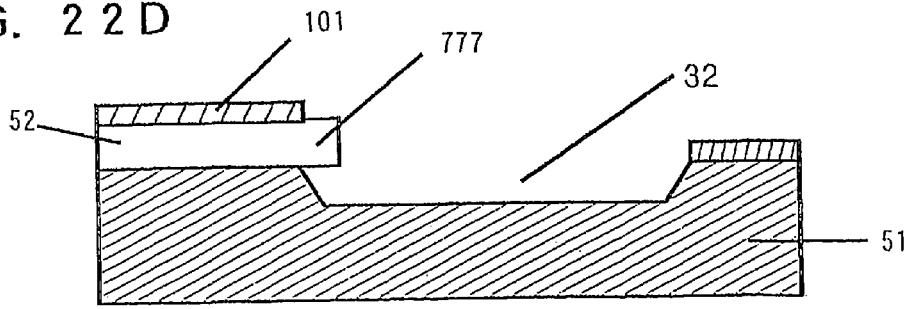

FIG. 19 is a side cross-section of an optical microcantilever of a seventh embodiment of the present invention. With this optical microcantilever 100, an optical fiber guide channel 32 for supporting an optical fiber is formed at a support section 31, and the optical waveguide 2 has a projecting section 777 projecting above the optical fiber guide channel 32. The optical fiber guide channel 32 is, for example, a V-shaped groove. Other aspects of the configuration are the same as the configuration for the optical microcantilever 10 of the first embodiment and are not described. In addition to an optical fiber, an optical element acting on light entering the optical waveguide or acting on light exiting from the optical waveguide can be, for example, a lightemitting diode, a semiconductor laser, a lens, a beam splitter, or a photodiode, etc. In this case, the optical fiber guide channel 32 is an optical element guide which is made to correspond to the states of the respective elements.

FIG. 20 shows the situation when an optical fiber 130 is fixed to the optical fiber guide channel 32 of the optical microcantilever 100. Light propagating from the optical fiber 130 enters the optical waveguide 2 via the light input/output end 8 and is guided to the microscopic aperture 6 by the optical waveguide 2. There is therefore little trouble involved in aligning the optical microcantilever 100 and the optical fiber 130 during changing of the optical microcantilever 100, etc., because the optical fiber guide channel 32 is formed in the optical microcantilever 100. Further, the optical fiber 130 can be located close to the light input/output end 8 because the light input/output end 8 is located above an inclined surface that presented an obstacle in the related art (refer to FIG. 14). Coupling loss between the optical fiber 130 and the optical waveguide 2 can therefore be reduced, the intensity of propagating light entering the optical waveguide 2 can be made more substantial, and near field light of a stronger intensity can be generated from the microscopic aperture 6.

FIG. 21 and FIG. 22 are views describing a method for forming the projecting section 777 of the optical microcantilever 100. The step of the situation shown in FIG. 21(a) is proceeded to using the method described in FIG. 2(a) to FIG. 2(e). When there is no reflecting film 7 between the optical waveguide 2 and the support 1, the reflecting film material 51 is not deposited and the process may proceed. The following is a description of the case where there is no reflecting film 7 between the optical waveguide 2 and the support 1. Next, the waveguide material 52 is patterned in the manner shown in FIG. 21(b) using photolithographic techniques and anisotropic etching. A mask 101 is then formed as shown in FIG. 21(c). The mask 101 is composed of, for example, silicon nitride or silicon dioxide. An enlarged plan view of the portion enclosed by a dotted line in FIG. 21(c) is shown in FIG. 22(a), and a cross-section taken along line A—A of FIG. 22(a) is shown in FIG. 22(b). The optical fiber guide channel 32 is then formed as shown in FIG. 21(d) by anisotropic wet etching of TMAH or KOH while at the same time the cantilever composed of the optical waveguide 2 is released. An enlarged plan view of the portion enclosed by a dotted line in FIG. 21(d) is shown in FIG. 22(c), and a cross-section taken along line A—A of FIG. 22(c) is shown in FIG. 22(d). The mask material 101 is then patterned as shown in FIG. 22(a) and the projecting section 777 is formed by carrying out crystal anisotropic etching. Next, as shown in FIG. 21(e), light-blocking material 55 and reflecting film material 51 is formed by sputtering or vacuum deposition, and a microscopic aperture is formed at the end of the tip 5. Finally, the optical microcantilever 100 is formed by removing unnecessary portions of the optical fiber channel 32.

Figure 23A:
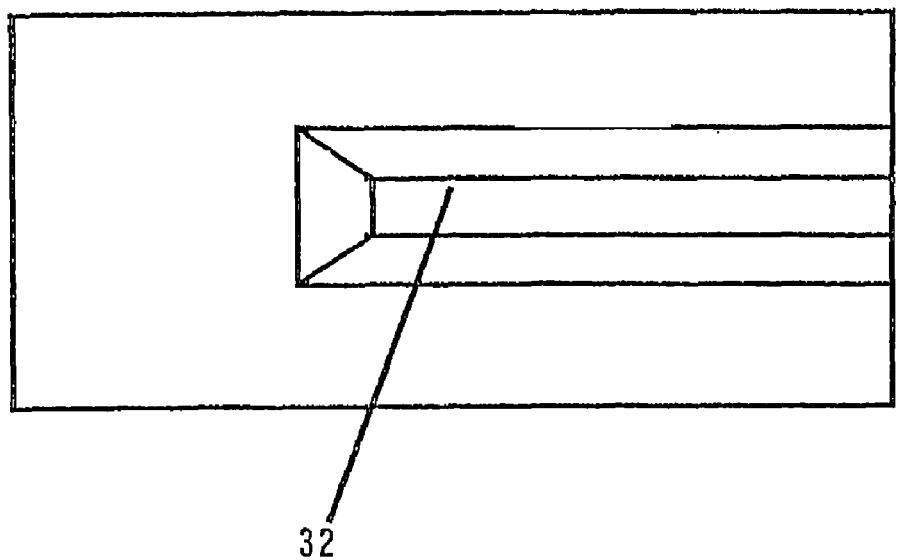
FIG. 23 is a view showing a pattern for an optical fiber channel of the optical microcantilever of FIG. 19.
Figure 23B:
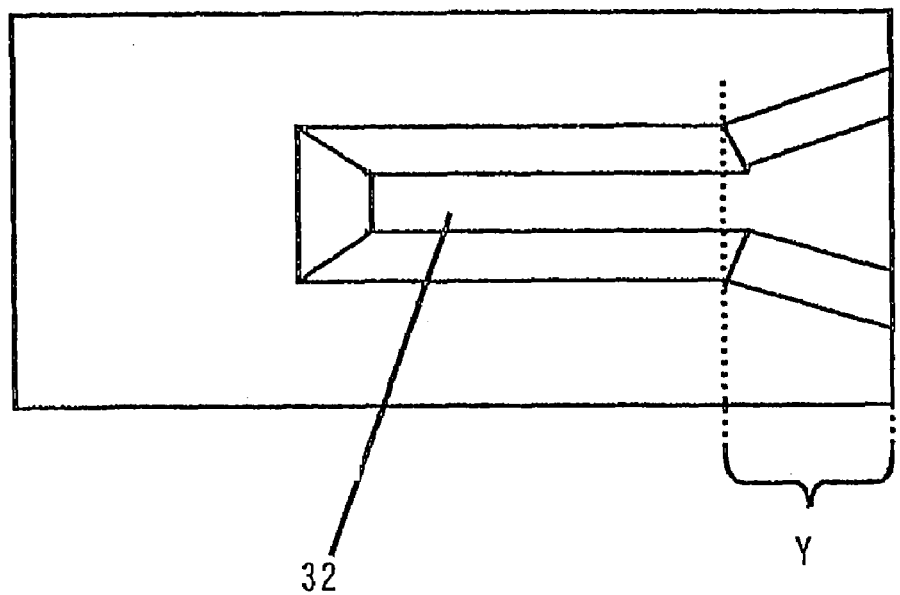

FIG. 23 is a plan view of the optical fiber channel 32. In addition to the pattern for the optical fiber channel 32 described in FIG. 22(c), the optical fiber channels 32 shown in FIG. 23(a) and FIG. 23(b) can also be formed by the step described in FIG. 21(d) by changing the pattern of the mask material 101 of FIG. 22(a). According to the structure shown in FIG. 23(a), this step is simplified because it is not necessary to remove unrequired portions of the optical fiber channel 32. Further, according to the structure shown in FIG. 23(b), the guide consists of the portion shown by Y in the drawings and it is therefore easy to introduce the optical fiber into the optical fiber channel 32.

This optical microcantilever 100 is employed in place of the optical microcantilever 10 of the scanning near field microscope 1000 of FIG. 3.

As described above, according to the optical microcantilever 100 of the present invention, the effects obtained for the third embodiment can be obtained just with a process of forming the optical fiber guide channel 32. The manufacturing process is therefore simplified and a lower cost optical microcantilever 100 can be provided. Further, according to the structure shown in FIG. 23(b), handling is made easier because the optical fiber can be installed in a straightforward manner.

EIGHTH EMBODIMENT

FIG. 24 is a structural view of a section for introducing light into an optical microcantilever of an eighth embodiment of the present invention.

A light introducing section of an optical microcantilever comprises a core 2a and cladding 2b of the optical waveguide 2 formed on the supporting part 1, and a core 110 and cladding 111 of a light propagating body for introducing light into the optical waveguide 2. The core 2a and the core 110 come into contact for a length L1, with a gap between the core 2a and the core 110 being a few tens to a few hundreds of nm. The length L1 is 500 to 3000 μm. When propagating light H from a light source (not shown) enters the core 110, light leaking out from the core 110 at the portion L1 combines with the core 2a and propagating light H within the core 2a can be propagated. FIG. 24(b) is a perspective view of the situation of FIG. 24(a). Just the core 2a and the core 110 are shown for simplicity. The width W1 of the core 2a is 5 to 100 μm and the width W2 of the core 110 is 3 to 50 μm and is smaller than W1. Light can therefore be introduced into the core 2a at a high coupling efficiency with normal micrometer precision.

Figure 24A:
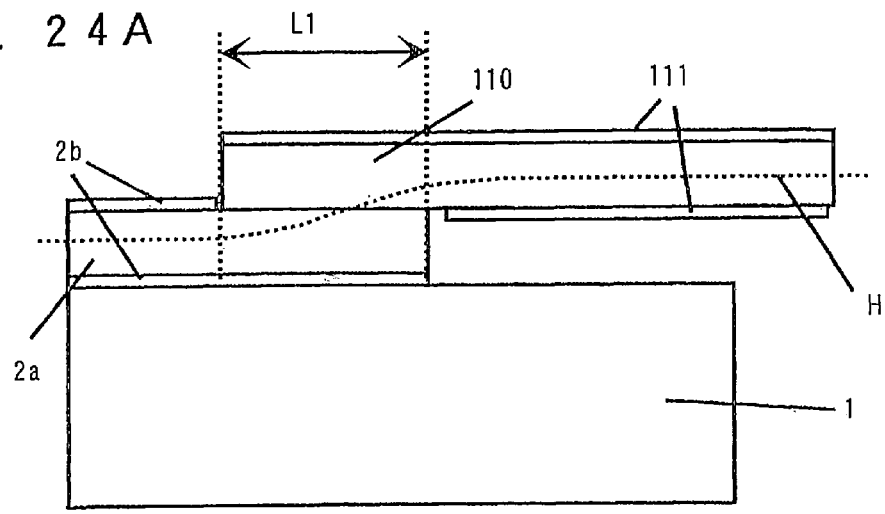
FIG. 24 is a structural view a section introducing light to an optical microcantilever of an eighth embodiment of the present invention.
Figure 24B:
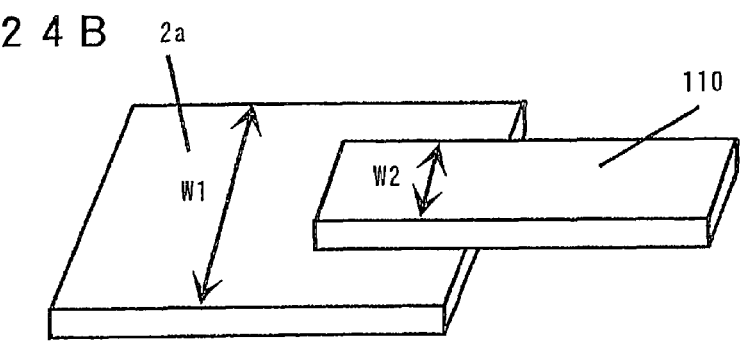
Figure 24C:
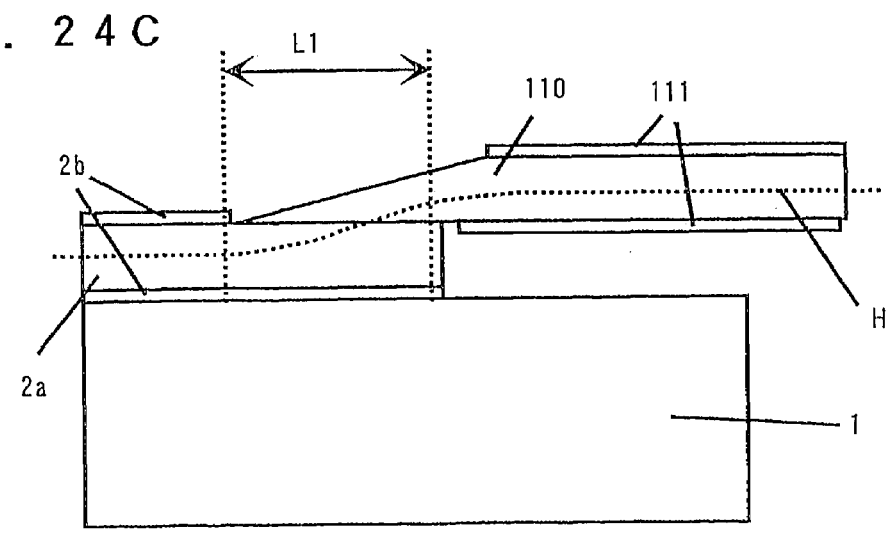

Further, as shown in FIG. 24(c) when the thickness of the core 110 gradually becomes thinner, a light introducing section of a higher coupling efficiency than that shown in FIG. 24(a) can be obtained.

As described above, according to the light introducing section of the eighth embodiment of the present invention, a light introducing section having a higher coupling efficiency can be obtained in a straightforward manner.

NINTH EMBODIMENT

FIG. 25 is a structural view of an optical microcantilever 200 of a ninth embodiment of the present invention. In addition to the structural elements of the optical microcantilever 100, the optical microcantilever 200 has a light-blocking wall 758. The light-blocking wall 758 comprises silicone rubber in, the form of resin or clay. The light-blocking wall is a few hundred Am to a few mm high and a few tens of μm to a few mm thick.

This optical microcantilever 200 is employed in place of the optical microcantilever 10 of the scanning near field microscope 1000 of FIG. 3.

Light scattered by the connecting part of the optical fiber 130 and the optical waveguide 2 can then be prevented from leaking in the direction of the tip 5 by the light-blocking wall 758. According to this optical microcantilever 1000, an optical image with a high S/N ratio can be obtained by a scanning near field microscope. When the sample being measured is a luminescent material, damage to the material in the form of bleaching can be avoided. The scanning speed of the scanning near field microscope can then be improved as a result of obtaining an optical signal with a high S/N ratio.

TENTH EMBODIMENT

FIG. 26 is a structural view of an optical microcantilever 300 of a tenth embodiment of the present invention. In addition to the structural elements of the optical microcantilever 100, the optical microcantilever 300 has light-blocking material 759 and a light-blocking film 760. The light-blocking material 759 is formed on the light-blocking film 3. The light-blocking film 760 is fixed by the light-blocking material 759 and the other end of the light-blocking film is covered by the output end of the optical fiber 130.

The light-blocking material 759 comprises silicone rubber in the form of resin or clay. The light-blocking film 760 consists of a metal such as aluminum or copper etc. or silicone rubber in the form of a resin. The light-blocking material 759 is a few tens of µm to 1 mm thick, and the light-blocking film 760 is a few tens to a few hundreds of µm thick. The light-blocking film 760 can therefore be moved by plastic or elastic deformation.

This optical microcantilever 300 is employed in place of the optical microcantilever 10 of the scanning near field microscope 1000 of FIG. 3.

According to this optical microcantilever 300, the effects described for the ninth embodiment can be obtained with the thin light-blocking material 759 and the light-blocking film 760 and the optical microcantilever 300 can therefore be thinner than the optical microcantilever 200. Further, as the light-blocking film 760 is movable, the light input/output end 8 can be made to be seen when deciding the position of the optical fiber 130 and positioning of the optical element can therefore be carried out in an accurate manner.

ELEVENTH EMBODIMENT

FIG. 27 is a structural view of an optical microcantilever 400 of a tenth embodiment of the present invention. In addition to the structural elements of the optical microcantilever 100, the optical microcantilever 400 has light-blocking material 759 and a light-blocking film 760. The light-blocking material 760 is directly fixed onto the light-blocking film 3 by the light-blocking material 759.

The light-blocking wall 759 comprises silicone rubber in the form of resin or clay. The light-blocking film 760 consists of a metal such as aluminum or copper etc. or silicone rubber in the form of a resin. The light-blocking material 759 is a few tens of µm to 1 mm thick, and the light-blocking film 760 is a few tens to a few hundreds of µm thick.

This optical microcantilever 400 is employed in place of the optical microcantilever 10 of the scanning near field microscope 1000 of FIG. 3.

According to the optical microcantilever 400, in addition to the effects described in the eleventh embodiment, the optical microcantilever can be made smaller than the optical microcantilever 300 described in the tenth embodiment because the thin light-blocking film 760 is fixed by the thin light-blocking material 759. Further, the light-blocking material 759 is in direct contact with the air and can therefore be dried easily, which means that the light-blocking film 760 can be fixed in a short time.

INDUSTRIAL APPLICABILITY

As described above, according to the optical microcantilever of claim 1, there is provided a reflecting film for reflecting light propagated from the light input/output end in such a manner that the light is guided towards the microscopic aperture, or reflecting light propagated from the microscopic aperture towards the light input/output end. Loss of propagating light due to the generation of near field light can therefore be reduced.

Further, according to the optical microcantilever of claim 2, there is provided a portion having an angle with respect to an optical axis of propagating light passing through the light input/output end and monitoring of surfaces of materials having substantial steps is therefore possible.

According to the optical microcantilever of claim 3, because the optical waveguide of this optical microcantilever comprises a core, and cladding deposited on one side of the core, or both sides of the core, or deposited so as to surround the core, propagating light propagated by the optical waveguide is prevented from leaking to the outside, and the propagating light is propagated within the optical waveguide under conditions of total reflection, so that light is propagated in an efficient manner.

Further, according to the optical microcantilever of claim 4, as a result of providing this optical microcantilever with a light-blocking film on the optical waveguide at the side where the tip is formed, and a reflecting film at the opposite side to the side where the tip is formed, propagating light propagated by the optical waveguide is prevented from leaking to the outside, and the propagating light is therefore propagated in an efficient manner.

Further, according to the method of manufacturing an optical microcantilever of claim 5, this manufacturing method includes the steps of forming a step of a prescribed angle at a substrate, depositing a reflecting film on the substrate, depositing an optical waveguide on the reflecting film, working the reflecting film and the optical waveguide so as to form a tip, depositing a light-blocking film on the optical waveguide, forming a microscopic aperture at the end of the tip, and forming a supporting section by having substrate remain on the side to be the light input/output end and removing the substrate on the side to be the free end. Propagating light loss can therefore be reduced, and an optical microcantilever with superior productivity and uniformity can be made in a straightforward manner.

Further, according to the method of manufacturing an optical microcantilever of claim 6, the angle of the step formed in the step forming step is an angle that enables propagating light propagating from the light input/output end to be guided towards the microscopic aperture by the reflecting film deposited in the reflecting film depositing step, or is an angle that enables propagating light propagating from the microscopic aperture to be guided towards the light input/output end. The propagating light can therefore be reflected in an efficient manner due to the generation of the near field light and an optical microcantilever where loss of propagating light is reduced can be easily made.

Further, according to the optical microcantilever of claim 7, by forming a channel between the light input/output end of the optical waveguide and the optical element guide, the optical element can be located close to the light input/output end and loss of propagating light can be reduced so that near field light of substantial intensity can be generated.

Further, according to the method of manufacturing an optical microcantilever of claim 8, there are provided the steps of forming a step at least in the proximity of a location at the light input/output end of the optical wave guide at the substrate, forming an optical element guide at the substrate, depositing an optical waveguide on the substrate, removing the optical waveguide at the location where the step is formed in the step forming step so as to form the light input/output end of the optical waveguide, forming a channel by working the substrate between the light input/output end and the optical element guide, removing the optical waveguide on the optical element guide so as to expose the optical element guide, and forming a supporting section by having substrate remain on the side to be the light input/output end and removing the substrate on the side to be the free end. Propagating light loss can therefore be reduced, and an optical microcantilever with superior productivity and uniformity can be made in a straightforward manner.

Further, according to the method of manufacturing an optical microcantilever of claim 9, there are provided the steps of forming a step at least in the proximity of a location at the light input/output end of the optical wave guide at the substrate, forming an optical element guide at the substrate, depositing a reflecting film on the substrate, depositing an optical waveguide on the reflecting film, working the optical waveguide so as to form a tip, depositing a light-blocking film on the optical waveguide, forming a microscopic aperture at the end of the tip, removing the light-blocking film, optical waveguide and reflecting film at the location where the step is formed in the step forming step so as to form the light input/output end of the optical waveguide, forming a channel by working the substrate between the-light input/output end and the optical element guide, removing the light-blocking film, optical waveguide, and reflecting film on the optical element guide so as to expose the optical element guide, and forming a supporting section by having substrate remain on the side to be the light input/output end and removing the substrate on the side to be the free end. An optical microcantilever which can easily be aligned with the optical element and which has superior productivity and uniformity can therefore be obtained.

Further, according to the optical microcantilever holder of claim 10, there is provided an optical microcantilever guide for supporting the optical microcantilever and an optical element guide for supporting an optical element for introducing light into the optical microcantilever. The optical microcantilever and the optical element can therefore be aligned simply by installing the optical microcantilever at the optical microcantilever guide and installing the optical element at the optical element guide and work involved in this alignment is kept to a minimum.

Further, according to the optical microcantilever of claim 11, monitoring of surfaces of materials having substantial steps is possible using the nose section. Further, according to the optical microcantilever of claim 12, the tip can be formed with a flat head portion, and forming of the tip is therefore straightforward.

Further, according to the optical microcantilever of claim 13 to claim 16, light of a high energy density can be guided into the microscopic aperture using the lens and near field light irradiated from the microscopic aperture can be of a substantial intensity; Further, light detected by the microscopic aperture can be transmitted to a detector in an efficient manner as detection light by collimating the detected light using the lens.

Further, according to the optical microcantilever of claim 17, because the tip of this optical microcantilever is formed of a material of a high refractive index, efficiency of irradiation of light from the microscopic aperture and/or the efficiency of generation of near field light to be detected and/or the efficiency of detection can be increased.

The S/N ratio of a light image can therefore be increased and the scanning speed be made faster for the scanning near field microscope. The efficiency of generation and/or detection of the near field light is therefore good, and an optical microcantilever suited to applications in the fields of processing and analysis can therefore be provided.

Further, according to the optical microcantilever of claim 18, a distance between the light input/output end and the optical element can be made shorter because the light input/output end projects above the optical-element guide. The efficiency with which light entering the optical waveguide and/or light outputted from the optical waveguide can be introduced and/or detected is therefore good.

Further, according to the optical microcantilever of claim 19 to claim 23, the light-blocking means ensures that light scattered by the light input/output end is not transmitted in the direction of the tip and this therefore improves the S/N ratio of optical images of the scanning near field microscope, so that the scanning speed of the scanning near field microscope can be improved accordingly. Further, deciding of the position of the optical element and the light input/output end of the waveguide can be performed during observation because the light-blocking film is movable and positioning of the optical element can therefore be carried out in a precise and straightforward manner.

The invention claimed is:

1. An optical microcantilever for a scanning near field microscope, comprising:
   an optical waveguide, having a light input/output end and a free end, for propagating light;
   a tip formed at the free end of the optical waveguide, the tip having a microscopic aperture at an end thereof;
   reflecting means for reflecting light propagated from the light input/output end in such a manner that the light is guided towards the microscopic aperture, for reflecting light propagated from the microscopic aperature towards the light input/output end; and
   a lens disposed between the tip and the reflecting means.

2. An optical microcantilever according to claim 1; wherein the lens is a convex lens.

3. An optical microcantilever according to claim 1; wherein the lens is a Fresnel lens.

4. An optical microcantilever according to claim 1; wherein the lens is a gradient index lens.

5. An optical microcantilever according to claim 1; wherein the tip of the optical microcantilever is formed of a material having a higher refractive index than the optical waveguide.

6. An optical microcantilever for a scanning near field microscope, comprising; an optical waveguide that has a light input/output end and a free end and that propagates light from one of the ends to the other of the ends; a tip at the free end of the optical waveguide, the tip having a microscopic aperture at a distal end thereof; a reflector that reflects light propagated from the light input/output end towards the microscopic aperture or that reflects light propagated from the microscopic aperture toward the light input/output end; and a lens that focuses light, propagated from the light input/output end and reflected by the reflector, in the vicinity of the microscopic aperture.

7. An optical microcantilever according to claim 6; wherein the lens is formed at a boundary between the tip and the optical waveguide.

8. An optical microcantilever according to claim 6; wherein the tip projects outwardly from a side of the optical waveguide at the free end thereof.

9. An optical microcantilever according to claim 8; wherein the reflector comprises a reflecting film formed on a surface of the optical waveguide.

10. An optical microcantilever according to claim 9; wherein the tip is comprised of a material having a higher refractive index than that of the optical waveguide.

11. An optical microcantilever according to claim 10; wherein the lens is a convex lens.

12. An optical microcantilever according to claim 10; wherein the lens is a Fresnel lens.

13. An optical microcantilever according to claim 10; wherein the lens is a gradient index lens.

14. An optical microcantilever according to claim 6; wherein the reflector comprises a reflecting film formed on a surface of the optical waveguide.

15. An optical microcantilever according to claim 6; wherein the tip is comprised of a material having a higher refractive index than that of the optical waveguide .

* * * * *